US008221218B2

(12) United States Patent
Gilliland et al.

(10) Patent No.: US 8,221,218 B2
(45) **Date of Patent: *Jul. 17, 2012**

(54) GAMING DEVICE HAVING MULTIPLE SELECTABLE DISPLAY INTERFACES BASED ON PLAYER'S WAGERS

(75) Inventors: John G. Gilliland, Washoe Valley, NV (US); Jeffrey P. Laakso, Reno, NV (US); Joseph E. Kaminkow, Reno, NV (US); James A. Vasquez, Carson City, NV (US)

(73) Assignee: IGT, Reno, NV (US)

(*) Notice: Subject to any disclaimer, the term of this patent is extended or adjusted under 35 U.S.C. 154(b) by 216 days.

This patent is subject to a terminal disclaimer.

(21) Appl. No.: 12/713,392

(22) Filed: Feb. 26, 2010

(65) Prior Publication Data

US 2010/0160031 A1 Jun. 24, 2010

Related U.S. Application Data

(60) Division of application No. 10/953,123, filed on Sep. 28, 2004, now Pat. No. 7,699,699, which is a continuation-in-part of application No. 10/659,093, filed on Sep. 9, 2003, now Pat. No. 7,695,363, which is a continuation-in-part of application No. 09/602,331, filed on Jun. 23, 2000, now Pat. No. 6,731,313.

(51) Int. Cl.
*A63F 13/00* (2006.01)

(52) U.S. Cl. ................ 463/20; 463/16; 463/17; 463/18; 463/19; 463/25; 463/31

(58) Field of Classification Search ............. 463/16–20, 463/25, 30, 31, 39–43
See application file for complete search history.

(56) References Cited

U.S. PATENT DOCUMENTS

| | | | |
|---|---|---|---|
| 3,831,172 | A | 8/1974 | Olliges et al. |
| 4,300,225 | A | 11/1981 | Lambl |
| 4,314,236 | A | 2/1982 | Mayer et al. |

(Continued)

FOREIGN PATENT DOCUMENTS

| | | |
|---|---|---|
| EP | 0 813 132 | 12/1997 |

(Continued)

OTHER PUBLICATIONS

American Heritage Dictionary of the English Language, definition of "correspond". Fourth Edition, Published by Houghton Mifflin Company 2006. Online at http://dictionary.reference.com, obtained Sep. 14, 2007.

(Continued)

*Primary Examiner* — Sunit Pandya
(74) *Attorney, Agent, or Firm* — Neal, Gerber & Eisenberg LLP

(57) ABSTRACT

An apparatus and method for displaying multiple gaming device interfaces for the same wagering game is provided. The game can be a slot game although other wagering games are also within the scope of the present invention. In one embodiment, the exact same game is played using one of a plurality of different display interfaces, wherein the gaming device enables the player to select which interface to play. The player can play the game using one interface and then switch interfaces to provide a fresh display or to change the player's luck. The player can then switch back to the original interface or select a brand new interface depending upon how many interfaces overall are provided.

24 Claims, 23 Drawing Sheets

U.S. PATENT DOCUMENTS 4,335,809 A 6/1982 Wain
4,339,798 A 7/1982 Hedges et al.
4,344,345 A 8/1982 Sano
4,363,482 A 12/1982 Goldfarb
RE31,441 E 11/1983 Nutting et al.
4,496,149 A 1/1985 Schwartzberg
4,572,509 A 2/1986 Sitrick
4,582,324 A 4/1986 Koza et al.
4,618,150 A 10/1986 Kimura
4,624,459 A 11/1986 Kaufman
4,652,998 A 3/1987 Koza et al.
4,660,107 A 4/1987 Chippendale, Jr.
4,695,053 A 9/1987 Vazquez, Jr. et al.
4,712,189 A 12/1987 Mohri
4,732,386 A 3/1988 Rayfiel
4,733,593 A 3/1988 Rothbart
4,791,558 A 12/1988 Chaitin et al.
4,842,278 A 6/1989 Markowicz
4,856,787 A 8/1989 Itkis
4,866,515 A 9/1989 Tagawa et al.
4,876,937 A 10/1989 Suzuki
4,924,378 A 5/1990 Hershey et al.
4,961,575 A 10/1990 Perry
4,974,483 A 12/1990 Luzzatto
4,974,857 A 12/1990 Beall et al.
5,046,735 A 9/1991 Hamano et al.
5,096,195 A 3/1992 Gimmon
5,119,465 A 6/1992 Jack et al.
5,123,649 A 6/1992 Tiberio
5,138,712 A 8/1992 Corbin
5,142,622 A 8/1992 Owens
5,179,517 A 1/1993 Sarbin et al.
5,221,801 A 6/1993 Bruti et al.
5,223,828 A 6/1993 McKiel, Jr.
5,242,163 A 9/1993 Fulton
5,258,574 A 11/1993 Kawano
5,266,736 A 11/1993 Saito
5,275,400 A 1/1994 Weingardt et al.
5,276,312 A 1/1994 McCarthy
5,287,102 A 2/1994 McKiel, Jr.
5,288,978 A 2/1994 Iijima
5,305,195 A 4/1994 Murphy
5,331,112 A 7/1994 Sato et al.
5,342,047 A 8/1994 Heidel et al.
5,344,144 A 9/1994 Canon
5,349,642 A 9/1994 Kingdon
5,371,345 A 12/1994 LeStrange et al.
5,375,206 A 12/1994 Hunter et al.
5,377,993 A 1/1995 Josephs
5,390,938 A 2/1995 Takeya
5,393,061 A 2/1995 Manship et al.
5,393,070 A 2/1995 Best
5,404,567 A 4/1995 DePietro et al.
5,429,361 A 7/1995 Raven et al.
5,429,507 A 7/1995 Kaplan
5,429,513 A 7/1995 Diaz-Plaza
5,430,791 A 7/1995 Feit et al.
5,430,835 A 7/1995 Williams et al.
5,438,508 A 8/1995 Wyman
5,446,902 A 8/1995 Islam
5,449,173 A 9/1995 Thomas et al.
5,465,082 A 11/1995 Chaco
5,469,511 A 11/1995 Lewis et al.
5,470,233 A 11/1995 Fruchterman et al.
5,472,197 A 12/1995 Gwiasda et al.
5,499,340 A 3/1996 Barritz
5,507,491 A 4/1996 Gatto et al.
5,508,699 A 4/1996 Silverman
5,511,781 A 4/1996 Wood et al.
5,515,764 A 5/1996 Rosen
5,530,232 A 6/1996 Taylor
5,559,313 A 9/1996 Claus et al.
5,560,603 A 10/1996 Seelig et al.
5,564,700 A 10/1996 Celona
5,566,337 A 10/1996 Szymanski et al.
5,577,253 A 11/1996 Blickstein
5,578,808 A 11/1996 Taylor
5,586,257 A 12/1996 Perlman
5,586,937 A 12/1996 Menashe
5,606,144 A 2/1997 Dabby
5,611,535 A 3/1997 Tiberio
5,617,331 A 4/1997 Wakai et al.
5,625,845 A 4/1997 Allran
5,626,341 A 5/1997 Jones et al.
5,630,754 A 5/1997 Rebane
5,630,757 A 5/1997 Gagin et al.
5,640,192 A 6/1997 Garfinkle
5,643,086 A 7/1997 Alcorn et al.
5,649,118 A 7/1997 Carlisle et al.
5,655,603 A 8/1997 Schulte et al.
5,655,961 A 8/1997 Acres et al.
5,664,998 A 9/1997 Seelig et al.
5,668,996 A 9/1997 Radinsky
5,671,412 A 9/1997 Christiano
5,695,188 A 12/1997 Ishibashi
5,697,843 A 12/1997 Manship et al.
5,702,304 A 12/1997 Acres et al.
5,703,310 A 12/1997 Kurakake et al.
5,707,286 A 1/1998 Carlson
5,708,709 A 1/1998 Rose
5,715,459 A 2/1998 Celi
5,717,604 A 2/1998 Wiggins
5,741,183 A 4/1998 Acres et al.
5,745,761 A 4/1998 Celi
5,745,762 A 4/1998 Celi
5,745,879 A 4/1998 Wyman
5,752,882 A 5/1998 Acres et al.
5,755,621 A 5/1998 Marks et al.
5,758,069 A 5/1998 Olsen
5,758,875 A 6/1998 Giacalone, Jr.
5,759,102 A 6/1998 Pease et al.
5,762,552 A 6/1998 Vuong et al.
5,766,074 A 6/1998 Cannon et al.
5,766,076 A 6/1998 Pease et al.
5,768,382 A 6/1998 Schneier et al.
5,769,716 A 6/1998 Saffari et al.
5,772,509 A 6/1998 Weiss
5,778,231 A 7/1998 Van Hoff
5,779,545 A 7/1998 Berg et al.
5,779,549 A 7/1998 Walker et al.
5,792,972 A 8/1998 Houston
5,800,268 A 9/1998 Molnick
5,802,364 A 9/1998 Senator
5,806,855 A 9/1998 Cherry
5,807,172 A 9/1998 Piechowiak
5,809,303 A 9/1998 Senator
5,812,688 A 9/1998 Gibson
5,820,459 A 10/1998 Acres et al.
5,823,873 A 10/1998 Moody
5,828,840 A 10/1998 Cowan et al.
5,833,538 A 11/1998 Weiss
5,833,540 A 11/1998 Miodunski et al.
5,836,817 A 11/1998 Acres et al.
5,839,958 A 11/1998 Ozarow
5,845,283 A 12/1998 Williams et al.
5,848,932 A 12/1998 Adams
5,851,011 A 12/1998 Loff
5,851,147 A 12/1998 Stupak et al.
5,851,149 A 12/1998 Xidos et al.
5,854,927 A 12/1998 Gelissen
5,855,515 A 1/1999 Pease et al.
5,871,398 A 2/1999 Schneier et al.
5,876,284 A 3/1999 Acres et al.
5,880,386 A 3/1999 Wachi et al.
5,885,158 A 3/1999 Torango et al.
5,889,990 A 3/1999 Coleman
5,892,171 A 4/1999 Ide
5,902,184 A 5/1999 Bennett et al.
5,903,732 A 5/1999 Reed et al.
5,905,248 A 5/1999 Russell et al.
5,908,354 A 6/1999 Okuniewicz
5,910,048 A 6/1999 Feinberg
5,911,071 A 6/1999 Jordan
5,913,164 A 6/1999 Pawa et al.
5,917,725 A 6/1999 Thacher et al.
5,918,039 A 6/1999 Buswell et al.
5,920,720 A 7/1999 Toutonghi

| | | | |
|---|---|---|---|
| 5,920,842 | A | 7/1999 | Cooper et al. |
| 5,923,878 | A | 7/1999 | Marsland |
| 5,923,880 | A | 7/1999 | Rose |
| 5,925,127 | A | 7/1999 | Ahmad |
| 5,930,509 | A | 7/1999 | Yates |
| 5,937,193 | A | 8/1999 | Evoy |
| 5,941,773 | A | 8/1999 | Harlick |
| 5,946,487 | A | 8/1999 | Dangelo |
| 5,946,489 | A | 8/1999 | Yellin |
| 5,947,822 | A | 9/1999 | Weiss |
| 5,951,397 | A | 9/1999 | Dickinson |
| 5,951,611 | A | 9/1999 | La Pierre |
| 5,964,843 | A | 10/1999 | Eisler et al. |
| 5,966,535 | A | 10/1999 | Benedikt |
| 5,967,894 | A | 10/1999 | Kinoshita et al. |
| 5,970,143 | A | 10/1999 | Schneier et al. |
| 5,970,249 | A | 10/1999 | Holzle |
| 5,971,271 | A | 10/1999 | Wynn et al. |
| 5,971,849 | A | 10/1999 | Falciglia |
| 5,974,409 | A | 10/1999 | Sanu et al. |
| 5,978,585 | A | 11/1999 | Crelier |
| 5,980,093 | A | 11/1999 | Jones et al. |
| 5,980,384 | A | 11/1999 | Barrie |
| 5,983,190 | A | 11/1999 | Trower, II et al. |
| 5,991,760 | A | 11/1999 | Gauvin et al. |
| 5,991,790 | A | 11/1999 | Shah et al. |
| 5,996,068 | A | 11/1999 | Dwyer, III et al. |
| 5,997,401 | A | 12/1999 | Crawford |
| 5,999,731 | A | 12/1999 | Yellin |
| 5,999,808 | A | 12/1999 | LaDue |
| 6,001,016 | A | 12/1999 | Walker et al. |
| 6,003,038 | A | 12/1999 | Chen |
| 6,003,066 | A | 12/1999 | Ryan et al. |
| 6,003,094 | A | 12/1999 | Dean |
| 6,003,123 | A | 12/1999 | Carter et al. |
| 6,011,850 | A | 1/2000 | Bertrand et al. |
| 6,015,346 | A | 1/2000 | Bennett |
| D421,277 | S | 2/2000 | McGahn et al. |
| 6,021,272 | A | 2/2000 | Cahill |
| 6,021,273 | A | 2/2000 | Griesemer |
| 6,024,640 | A | 2/2000 | Walker et al. |
| 6,026,238 | A | 2/2000 | Bond |
| 6,027,115 | A | 2/2000 | Griswold et al. |
| 6,029,000 | A | 2/2000 | Woolsey |
| 6,031,993 | A | 2/2000 | Andrews |
| 6,035,120 | A | 3/2000 | Ravichandran |
| 6,052,527 | A | 4/2000 | Delcourt et al. |
| 6,056,642 | A | 5/2000 | Bennett |
| 6,062,979 | A | 5/2000 | Inoue |
| 6,066,181 | A | 5/2000 | DeMaster |
| 6,068,552 | A | 5/2000 | Walker et al. |
| 6,068,982 | A | 5/2000 | Rolfe et al. |
| 6,071,190 | A | 6/2000 | Weiss et al. |
| 6,071,192 | A | 6/2000 | Weiss |
| 6,074,432 | A | 6/2000 | Guccione |
| 6,075,940 | A | 6/2000 | Gosling |
| 6,079,985 | A | 6/2000 | Wohl et al. |
| 6,084,169 | A | 7/2000 | Hasegawa et al. |
| 6,085,247 | A | 7/2000 | Parsons, Jr. et al. |
| 6,089,975 | A | 7/2000 | Dunn |
| 6,089,976 | A | 7/2000 | Schneider et al. |
| 6,089,978 | A | 7/2000 | Adams |
| 6,089,982 | A | 7/2000 | Holch et al. |
| 6,092,147 | A | 7/2000 | Levy |
| 6,096,095 | A | 8/2000 | Halstead |
| 6,099,408 | A | 8/2000 | Schneier et al. |
| 6,102,400 | A | 8/2000 | Scott et al. |
| 6,103,964 | A | 8/2000 | Kay |
| 6,106,393 | A | 8/2000 | Sunaga et al. |
| 6,106,396 | A | 8/2000 | Alcorn et al. |
| 6,108,420 | A | 8/2000 | Larose et al. |
| 6,110,041 | A | 8/2000 | Walker et al. |
| 6,110,043 | A | 8/2000 | Olsen |
| 6,110,226 | A | 8/2000 | Bothner |
| 6,113,098 | A | 9/2000 | Adams |
| 6,113,495 | A | 9/2000 | Walker et al. |
| 6,117,009 | A | 9/2000 | Yoseloff |
| 6,117,013 | A | 9/2000 | Eiba |
| 6,126,165 | A | 10/2000 | Sakamoto |
| 6,131,191 | A | 10/2000 | Cierniak |
| 6,135,884 | A | 10/2000 | Hedrick et al. |
| 6,135,887 | A | 10/2000 | Pease et al. |
| 6,138,273 | A | 10/2000 | Sturges |
| 6,141,737 | A | 10/2000 | Krantz et al. |
| 6,141,794 | A | 10/2000 | Dice |
| 6,142,872 | A | 11/2000 | Walker et al. |
| 6,142,875 | A | 11/2000 | Kodachi et al. |
| 6,146,272 | A | 11/2000 | Walker et al. |
| 6,146,273 | A | 11/2000 | Olsen |
| 6,146,276 | A | 11/2000 | Okuniewicz |
| 6,149,522 | A | 11/2000 | Alcorn et al. |
| 6,151,707 | A | 11/2000 | Hecksel et al. |
| 6,155,925 | A | 12/2000 | Giobbi et al. |
| 6,159,096 | A | 12/2000 | Yoseloff |
| 6,159,097 | A | 12/2000 | Gura |
| 6,162,122 | A | 12/2000 | Acres et al. |
| 6,168,519 | B1 | 1/2001 | Nakagawa et al. |
| 6,174,233 | B1 | 1/2001 | Sunaga et al. |
| 6,174,235 | B1 | 1/2001 | Walker et al. |
| 6,175,632 | B1 | 1/2001 | Marx |
| 6,186,894 | B1 | 2/2001 | Mayeroff |
| 6,190,255 | B1 | 2/2001 | Thomas et al. |
| 6,198,395 | B1 | 3/2001 | Sussman |
| 6,206,782 | B1 | 3/2001 | Walker et al. |
| 6,217,448 | B1 | 4/2001 | Olsen |
| 6,219,836 | B1 | 4/2001 | Wells et al. |
| 6,224,482 | B1 | 5/2001 | Bennett |
| 6,224,486 | B1 | 5/2001 | Walker et al. |
| 6,227,971 | B1 | 5/2001 | Weiss |
| 6,233,731 | B1 | 5/2001 | Bond et al. |
| 6,238,288 | B1 | 5/2001 | Walker et al. |
| 6,241,608 | B1 | 6/2001 | Torango |
| 6,241,612 | B1 | 6/2001 | Heredia |
| 6,251,014 | B1 | 6/2001 | Stockdale et al. |
| 6,254,481 | B1 | 7/2001 | Jaffe |
| 6,254,483 | B1 | 7/2001 | Acres |
| 6,257,981 | B1 | 7/2001 | Acres et al. |
| 6,264,556 | B1 | 7/2001 | Izawa et al. |
| 6,264,561 | B1 | 7/2001 | Saffari et al. |
| 6,270,411 | B1 | 8/2001 | Gura et al. |
| 6,287,197 | B1 | 9/2001 | Dickinson et al. |
| 6,287,200 | B1 | 9/2001 | Sharma |
| 6,287,202 | B1 | 9/2001 | Pascal et al. |
| 6,290,600 | B1 | 9/2001 | Glasson |
| 6,293,866 | B1 | 9/2001 | Walker et al. |
| 6,293,869 | B1 | 9/2001 | Kwan et al. |
| 6,295,638 | B1 | 9/2001 | Brown et al. |
| 6,302,790 | B1 | 10/2001 | Brossard |
| 6,302,791 | B1 | 10/2001 | Frohm et al. |
| 6,304,905 | B1 | 10/2001 | Clark |
| 6,306,034 | B1 | 10/2001 | Sakamoto et al. |
| 6,308,271 | B2 | 10/2001 | Tanaka |
| 6,309,299 | B1 | 10/2001 | Weiss |
| 6,309,301 | B1 | 10/2001 | Sano |
| 6,311,982 | B1 | 11/2001 | Lebensfeld et al. |
| 6,312,332 | B1 | 11/2001 | Walker et al. |
| 6,312,333 | B1 | 11/2001 | Acres |
| 6,319,122 | B1 | 11/2001 | Packes, Jr. et al. |
| 6,319,125 | B1 | 11/2001 | Acres |
| 6,321,323 | B1 | 11/2001 | Nugroho et al. |
| 6,325,716 | B1 | 12/2001 | Walker et al. |
| 6,328,648 | B1 | 12/2001 | Walker et al. |
| 6,345,386 | B1 | 2/2002 | Delo et al. |
| 6,353,928 | B1 | 3/2002 | Altberg et al. |
| 6,354,946 | B1 | 3/2002 | Finn |
| 6,358,147 | B1 | 3/2002 | Jaffe et al. |
| 6,358,150 | B1 | 3/2002 | Mir et al. |
| 6,361,437 | B1 | 3/2002 | Walker et al. |
| 6,361,441 | B1 | 3/2002 | Walker et al. |
| 6,364,314 | B1 | 4/2002 | Canterbury |
| 6,364,768 | B1 | 4/2002 | Acres et al. |
| 6,368,216 | B1 | 4/2002 | Hedrick et al. |
| 6,375,567 | B1 | 4/2002 | Acres |
| 6,375,568 | B1 | 4/2002 | Roffman et al. |
| 6,375,569 | B1 | 4/2002 | Acres |
| 6,383,074 | B1 | 5/2002 | Boggs |
| 6,389,538 | B1 | 5/2002 | Gruse et al. |
| 6,389,589 | B1 | 5/2002 | Mishra et al. |

| | | | |
|---|---|---|---|
| 6,390,923 | B1 | 5/2002 | Yoshitomi et al. |
| 6,394,900 | B1 | 5/2002 | McGlone et al. |
| 6,394,907 | B1 | 5/2002 | Rowe |
| 6,397,381 | B1 | 5/2002 | Delo et al. |
| 6,402,614 | B1 | 6/2002 | Schneier et al. |
| 6,409,596 | B1 | 6/2002 | Hayashida et al. |
| 6,409,602 | B1 | 6/2002 | Wiltshire et al. |
| 6,416,411 | B1 | 7/2002 | Tsukahara |
| 6,418,554 | B1 | 7/2002 | Delo et al. |
| 6,425,828 | B2 | 7/2002 | Walker et al. |
| 6,427,227 | B1 | 7/2002 | Chamberlain |
| 6,439,996 | B2 | 8/2002 | LeMay et al. |
| 6,442,529 | B1 | 8/2002 | Krishan et al. |
| 6,443,837 | B1 | 9/2002 | Jaffe et al. |
| 6,443,839 | B2 | 9/2002 | Stockdale et al. |
| 6,450,887 | B1 | 9/2002 | Mir et al. |
| 6,454,649 | B1 | 9/2002 | Mattice |
| 6,457,175 | B1 | 9/2002 | Lerche |
| RE37,885 | E | 10/2002 | Acres et al. |
| 6,488,585 | B1 | 12/2002 | Wells et al. |
| 6,491,584 | B2 | 12/2002 | Graham et al. |
| 6,503,146 | B2 | 1/2003 | Walker et al. |
| 6,503,147 | B1 | 1/2003 | Stockdale et al. |
| 6,504,089 | B1 | 1/2003 | Negishi et al. |
| 6,508,710 | B1 | 1/2003 | Paravia et al. |
| 6,516,466 | B1 | 2/2003 | Jackson |
| 6,520,856 | B1 | 2/2003 | Walker et al. |
| 6,523,166 | B1 | 2/2003 | Mishra et al. |
| 6,527,638 | B1 | 3/2003 | Walker et al. |
| 6,532,543 | B1 | 3/2003 | Smith et al. |
| 6,533,658 | B1 | 3/2003 | Walker et al. |
| 6,533,664 | B1 | 3/2003 | Crumby |
| 6,537,152 | B2 | 3/2003 | Seelig et al. |
| 6,544,122 | B2 | 4/2003 | Araki et al. |
| 6,554,703 | B1 | 4/2003 | Bussick et al. |
| 6,561,903 | B2 | 5/2003 | Walker et al. |
| 6,561,908 | B1 | 5/2003 | Hoke |
| 6,565,433 | B1 | 5/2003 | Baerlocher et al. |
| 6,565,434 | B1 | 5/2003 | Acres |
| 6,565,436 | B1 | 5/2003 | Baerlocher |
| 6,575,832 | B1 | 6/2003 | Manfredi et al. |
| 6,578,199 | B1 | 6/2003 | Tsou et al. |
| 6,592,457 | B1 | 7/2003 | Frohm et al. |
| 6,595,856 | B1 | 7/2003 | Ginsburg et al. |
| 6,599,195 | B1 | 7/2003 | Araki et al. |
| 6,604,740 | B1 | 8/2003 | Singer et al. |
| 6,607,439 | B2 | 8/2003 | Schneier et al. |
| 6,609,972 | B2 | 8/2003 | Seelig et al. |
| 6,609,978 | B1 | 8/2003 | Paulsen |
| 6,612,574 | B1 | 9/2003 | Cole et al. |
| 6,620,047 | B1 | 9/2003 | Alcorn et al. |
| 6,628,939 | B2 | 9/2003 | Paulsen |
| 6,638,169 | B2 | 10/2003 | Wilder et al. |
| 6,638,170 | B1 | 10/2003 | Crumby |
| 6,645,077 | B2 | 11/2003 | Rowe |
| 6,656,046 | B1 | 12/2003 | Yoseloff et al. |
| 6,682,073 | B2 | 1/2004 | Bryant et al. |
| 6,682,423 | B2 | 1/2004 | Brosnan et al. |
| 6,685,567 | B2 | 2/2004 | Cockerille et al. |
| 6,688,976 | B1 | 2/2004 | Tulley et al. |
| 6,692,353 | B2 | 2/2004 | Walker et al. |
| 6,712,699 | B2 | 3/2004 | Walker et al. |
| 6,712,702 | B2 | 3/2004 | Goldberg et al. |
| 6,722,986 | B1 | 4/2004 | Lyons et al. |
| 6,729,618 | B1 | 5/2004 | Koenig et al. |
| 6,731,313 | B1 | 5/2004 | Kaminkow |
| 6,733,390 | B2 | 5/2004 | Walker et al. |
| 6,739,973 | B1 | 5/2004 | Lucchesi et al. |
| 6,746,327 | B2 | 6/2004 | Frohm et al. |
| 6,749,510 | B2 | 6/2004 | Giobbi |
| 6,755,738 | B2 | 6/2004 | Glasson et al. |
| 6,769,985 | B1 | 8/2004 | Laakso et al. |
| 6,782,477 | B2 | 8/2004 | McCarroll |
| 6,790,142 | B2 | 9/2004 | Okada et al. |
| 6,790,143 | B2 | 9/2004 | Crumby |
| 6,802,778 | B1 | 10/2004 | LeMay et al. |
| 6,804,763 | B1 | 10/2004 | Stockdale et al. |
| 6,805,634 | B1 | 10/2004 | Wells et al. |
| 6,810,517 | B2 | 10/2004 | Bond et al. |
| 6,811,488 | B2 | 11/2004 | Paravia et al. |
| 6,813,765 | B1 | 11/2004 | Flores |
| 6,816,882 | B1 | 11/2004 | Conner et al. |
| 6,823,456 | B1 | 11/2004 | Dan et al. |
| 6,830,515 | B2 | 12/2004 | Rowe |
| 6,832,958 | B2 | 12/2004 | Acres et al. |
| 6,834,245 | B2 | 12/2004 | Ota et al. |
| 6,835,132 | B2 | 12/2004 | Bennett |
| 6,835,134 | B2 | 12/2004 | Poole et al. |
| 6,836,794 | B1 | 12/2004 | Lucovsky et al. |
| 6,837,790 | B1 | 1/2005 | Kaminkow |
| 6,843,723 | B2 | 1/2005 | Joshi |
| 6,843,725 | B2 | 1/2005 | Nelson |
| 6,846,238 | B2 | 1/2005 | Wells |
| 6,848,996 | B2 | 2/2005 | Hecht et al. |
| 6,852,031 | B1 | 2/2005 | Rowe |
| 6,855,054 | B2 | 2/2005 | White et al. |
| 6,855,057 | B2 | 2/2005 | Namba et al. |
| 6,857,959 | B1 | 2/2005 | Nguyen |
| 6,863,608 | B1 | 3/2005 | LeMay et al. |
| 6,866,581 | B2 | 3/2005 | Martinek et al. |
| 6,866,584 | B2 | 3/2005 | Michaelson |
| 6,866,586 | B2 | 3/2005 | Oberberger et al. |
| 6,875,109 | B2 | 4/2005 | Stockdale |
| 6,875,110 | B1 | 4/2005 | Crumby |
| 6,878,063 | B2 | 4/2005 | Manfredi et al. |
| 6,884,162 | B2 | 4/2005 | Raverdy et al. |
| 6,884,166 | B2 | 4/2005 | Leen et al. |
| 6,884,170 | B2 | 4/2005 | Rowe |
| 6,884,171 | B2 | 4/2005 | Eck et al. |
| 6,884,173 | B2 | 4/2005 | Gauselmann |
| 6,884,174 | B2 | 4/2005 | Lundy et al. |
| 6,887,151 | B2 | 5/2005 | Leen et al. |
| 6,887,156 | B2 | 5/2005 | DeWeese et al. |
| 6,889,159 | B2 | 5/2005 | Klotz et al. |
| 6,890,256 | B2 | 5/2005 | Walker et al. |
| 6,896,616 | B2 | 5/2005 | Weiss |
| 6,896,618 | B2 | 5/2005 | Benoy et al. |
| 6,899,627 | B2 | 5/2005 | Lam et al. |
| 6,899,628 | B2 | 5/2005 | Leen et al. |
| 6,901,375 | B2 | 5/2005 | Fernandez |
| 6,902,481 | B2 | 6/2005 | Breckner et al. |
| 6,908,391 | B2 | 6/2005 | Gatto et al. |
| 6,910,965 | B2 | 6/2005 | Downes |
| 6,918,832 | B2 | 7/2005 | Baerlocher et al. |
| 6,935,955 | B1 | 8/2005 | Kaminkow et al. |
| 6,939,223 | B1 | 9/2005 | Jones |
| 6,939,226 | B1 | 9/2005 | Joshi |
| 6,939,234 | B2 | 9/2005 | Beatty |
| 6,942,571 | B1 | 9/2005 | McAllister et al. |
| 6,942,574 | B1 | 9/2005 | LeMay et al. |
| 6,945,870 | B2 | 9/2005 | Gatto et al. |
| 6,960,136 | B2 | 11/2005 | Joshi et al. |
| 6,964,609 | B2 | 11/2005 | Haag et al. |
| 6,974,385 | B2 | 12/2005 | Joshi et al. |
| 6,981,635 | B1 | 1/2006 | Hughs-Baird et al. |
| 6,991,543 | B2 | 1/2006 | Joshi |
| 6,991,544 | B2 | 1/2006 | Soltys et al. |
| 7,001,274 | B2 | 2/2006 | Baerlocher et al. |
| 7,014,559 | B1 | 3/2006 | Fong |
| 7,051,004 | B2 | 5/2006 | Nuttall et al. |
| 7,063,617 | B2 | 6/2006 | Brosnan et al. |
| 7,066,814 | B2 | 6/2006 | Glavich et al. |
| 7,070,501 | B2 | 7/2006 | Cormack et al. |
| 7,094,149 | B2 | 8/2006 | Walker et al. |
| 7,105,736 | B2 | 9/2006 | Laakso |
| 7,258,613 | B2 | 8/2007 | Lucchesi et al. |
| 2001/0024971 | A1 | 9/2001 | Brossard |
| 2001/0029542 | A1 | 10/2001 | Nishimura |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0053712 | A1 | 12/2001 | Yoseloff et al. |
| 2001/0055990 | A1 | 12/2001 | Acres |
| 2002/0013173 | A1 | 1/2002 | Walker et al. |
| 2002/0025844 | A1 | 2/2002 | Casey et al. |
| 2002/0032049 | A1 | 3/2002 | Walker et al. |
| 2002/0039919 | A1 | 4/2002 | Joshi et al. |
| 2002/0045484 | A1 | 4/2002 | Eck et al. |

2002/0057800 A1 5/2002 Gordon et al.
2002/0058546 A2 5/2002 Acres
2002/0068629 A1 6/2002 Allen et al.
2002/0068631 A1 6/2002 Raverdy et al.
2002/0071557 A1 6/2002 Nguyen
2002/0071560 A1 6/2002 Kurn et al.
2002/0077165 A1 6/2002 Bansemer et al.
2002/0080969 A1 6/2002 Giobbi
2002/0090990 A1* 7/2002 Joshi et al. ...................... 463/20
2002/0098883 A1 7/2002 Packes et al.
2002/0107067 A1 8/2002 McGlone et al.
2002/0109718 A1 8/2002 Mansour et al.
2002/0116615 A1 8/2002 Nguyen et al.
2002/0137217 A1 9/2002 Rowe
2002/0138594 A1 9/2002 Rowe
2002/0144116 A1 10/2002 Giobbi
2002/0151349 A1 10/2002 Joshi
2002/0151360 A1 10/2002 Durham et al.
2002/0160826 A1 10/2002 Gomez et al.
2002/0169022 A1 11/2002 Canterbury
2002/0173355 A1 11/2002 Walker et al.
2002/0174160 A1 11/2002 Gatto et al.
2002/0174444 A1 11/2002 Gatto et al.
2002/0177483 A1 11/2002 Cannon
2002/0188940 A1 12/2002 Breckner et al.
2002/0198044 A1 12/2002 Walker et al.
2003/0003988 A1 1/2003 Walker et al.
2003/0027619 A1 2/2003 Nicastro
2003/0027635 A1 2/2003 Walker et al.
2003/0027638 A1 2/2003 Schneider et al.
2003/0045351 A1 3/2003 Gauselmann
2003/0045354 A1 3/2003 Giobbi
2003/0054879 A1 3/2003 Schneier et al.
2003/0060286 A1 3/2003 Walker et al.
2003/0064771 A1 4/2003 Morrow et al.
2003/0064798 A1 4/2003 Grauzer et al.
2003/0064801 A1 4/2003 Breckner et al.
2003/0064807 A1 4/2003 Walker et al.
2003/0064808 A1 4/2003 Hecht et al.
2003/0069058 A1 4/2003 Byrne et al.
2003/0073489 A1 4/2003 Hecht et al.
2003/0073490 A1 4/2003 Hecht et al.
2003/0073491 A1 4/2003 Hecht et al.
2003/0073497 A1 4/2003 Nelson
2003/0078094 A1 4/2003 Gatto et al.
2003/0078101 A1 4/2003 Schneider et al.
2003/0078103 A1 4/2003 LeMay et al.
2003/0092489 A1 5/2003 Veradej
2003/0093669 A1 5/2003 Morais et al.
2003/0100359 A1 5/2003 Loose et al.
2003/0100369 A1 5/2003 Gatto et al.
2003/0100370 A1 5/2003 Gatto et al.
2003/0100371 A1 5/2003 Gatto et al.
2003/0100372 A1 5/2003 Gatto et al.
2003/0115351 A1 6/2003 Giobbi
2003/0119579 A1 6/2003 Walker et al.
2003/0140134 A1 7/2003 Swanson et al.
2003/0144052 A1 7/2003 Walker et al.
2003/0162589 A1 8/2003 Nguyen et al.
2003/0171149 A1 9/2003 Rothschild
2003/0176219 A1 9/2003 Manfredi et al.
2003/0181231 A1 9/2003 Vancura et al.
2003/0188306 A1 10/2003 Harris et al.
2003/0190941 A1 10/2003 Byrne
2003/0195033 A1 10/2003 Gazdic et al.
2003/0216182 A1 11/2003 Gauselmann
2003/0224852 A1 12/2003 Walker et al.
2003/0228904 A1 12/2003 Acres et al.
2003/0228907 A1 12/2003 Gatto et al.
2003/0228912 A1 12/2003 Wells et al.
2003/0232650 A1 12/2003 Beatty
2004/0002381 A1 1/2004 Alcorn et al.
2004/0002385 A1 1/2004 Nguyen
2004/0003389 A1 1/2004 Reynar et al.
2004/0005919 A1 1/2004 Walker et al.
2004/0009804 A1 1/2004 Dumont
2004/0010700 A1 1/2004 Mont
2004/0015423 A1 1/2004 Walker et al.
2004/0023721 A1 2/2004 Giobbi
2004/0024666 A1 2/2004 Walker et al.
2004/0029635 A1 2/2004 Giobbi
2004/0038723 A1 2/2004 Schneier et al.
2004/0048657 A1 3/2004 Gauselmann
2004/0048660 A1 3/2004 Gentles et al.
2004/0048667 A1 3/2004 Rowe
2004/0053664 A1 3/2004 Byrne
2004/0053695 A1 3/2004 Mattice et al.
2004/0054952 A1 3/2004 Morrow et al.
2004/0063489 A1 4/2004 Crumby
2004/0072604 A1 4/2004 Toyoda
2004/0072608 A1 4/2004 Toyoda
2004/0082385 A1 4/2004 Silva et al.
2004/0092310 A1 5/2004 Brosnan et al.
2004/0098597 A1 5/2004 Giobbi
2004/0106452 A1 6/2004 Nguyen et al.
2004/0116176 A1 6/2004 Tulley et al.
2004/0124243 A1 7/2004 Gatto et al.
2004/0127279 A1 7/2004 Gatto et al.
2004/0132532 A1 7/2004 Brosnan et al.
2004/0133485 A1 7/2004 Schoonmaker et al.
2004/0142739 A1 7/2004 Loose et al.
2004/0142742 A1 7/2004 Schneider et al.
2004/0142747 A1 7/2004 Pryzby
2004/0152509 A1 8/2004 Hornik et al.
2004/0162144 A1 8/2004 Loose et al.
2004/0166923 A1 8/2004 Michaelson et al.
2004/0166940 A1 8/2004 Rothschild
2004/0166942 A1 8/2004 Muir
2004/0176162 A1 9/2004 Rothschild
2004/0176167 A1 9/2004 Michaelson et al.
2004/0179701 A1 9/2004 Boyd
2004/0180721 A1 9/2004 Rowe
2004/0180722 A1 9/2004 Giobbi
2004/0185936 A1 9/2004 Block et al.
2004/0193726 A1 9/2004 Gatto et al.
2004/0198479 A1 10/2004 Martinek et al.
2004/0198489 A1 10/2004 Kaminkow et al.
2004/0198494 A1 10/2004 Nguyen et al.
2004/0198496 A1 10/2004 Gatto et al.
2004/0204244 A1 10/2004 Rathsack et al.
2004/0209685 A1 10/2004 Lucchesi et al.
2004/0214622 A1 10/2004 Atkinson
2004/0214627 A1 10/2004 Jordan et al.
2004/0214640 A1 10/2004 Giobbi
2004/0214641 A1 10/2004 Giobbi
2004/0215756 A1 10/2004 VanAntwerp et al.
2004/0219967 A1 11/2004 Giobbi et al.
2004/0219983 A1 11/2004 Giobbi
2004/0224770 A1 11/2004 Wolf et al.
2004/0229684 A1 11/2004 Blackburn et al.
2004/0229698 A1 11/2004 Lind et al.
2004/0229699 A1 11/2004 Gentles et al.
2004/0235559 A1 11/2004 Brosnan et al.
2004/0235563 A1 11/2004 Blackburn et al.
2004/0242298 A1 12/2004 Inamura et al.
2004/0242307 A1 12/2004 Laakso et al.
2004/0242328 A1 12/2004 Blackburn et al.
2004/0242329 A1 12/2004 Blackburn et al.
2004/0242330 A1 12/2004 Blackburn et al.
2004/0242331 A1 12/2004 Blackburn et al.
2004/0243848 A1 12/2004 Blackburn et al.
2004/0243849 A1 12/2004 Blackburn et al.
2004/0248642 A1 12/2004 Rothschild
2004/0248645 A1 12/2004 Blackburn et al.
2004/0248646 A1 12/2004 Canterbury
2004/0248651 A1 12/2004 Gagner
2004/0254006 A1 12/2004 Lam et al.
2004/0254013 A1 12/2004 Quraishi et al.
2004/0254014 A1 12/2004 Quraishi et al.
2004/0254954 A1 12/2004 Gatto et al.
2004/0255139 A1 12/2004 Giobbi
2004/0259629 A1 12/2004 Michaelson et al.
2004/0259633 A1 12/2004 Gentles et al.
2004/0259640 A1 12/2004 Gentles et al.
2004/0259643 A1 12/2004 Gentles
2004/0266532 A1 12/2004 Blackburn et al.
2004/0266533 A1 12/2004 Gentles et al.
2005/0003886 A1 1/2005 Englman et al.

| | | | | |
|---|---|---|---|---|
| 2005/0009599 | A1 | 1/2005 | Ryan | |
| 2005/0009601 | A1 | 1/2005 | Manfredi et al. | |
| 2005/0009607 | A1 | 1/2005 | Russell et al. | |
| 2005/0010738 | A1 | 1/2005 | Stockdale et al. | |
| 2005/0014559 | A1 | 1/2005 | Mattice et al. | |
| 2005/0032573 | A1 | 2/2005 | Acres et al. | |
| 2005/0032577 | A1 | 2/2005 | Blackburn et al. | |
| 2005/0037708 | A1 | 2/2005 | Torvinen | |
| 2005/0043072 | A1 | 2/2005 | Nelson | |
| 2005/0043088 | A1 | 2/2005 | Nguyen et al. | |
| 2005/0043090 | A1 | 2/2005 | Pryzby et al. | |
| 2005/0043094 | A1 | 2/2005 | Nguyen et al. | |
| 2005/0044535 | A1 | 2/2005 | Coppert. | |
| 2005/0049037 | A1 | 3/2005 | Anderson et al. | |
| 2005/0054431 | A1 | 3/2005 | Walker et al. | |
| 2005/0054438 | A1 | 3/2005 | Rothschild et al. | |
| 2005/0054440 | A1 | 3/2005 | Anderson et al. | |
| 2005/0054441 | A1 | 3/2005 | Landrum et al. | |
| 2005/0054442 | A1 | 3/2005 | Anderson et al. | |
| 2005/0054445 | A1 | 3/2005 | Gatto et al. | |
| 2005/0054447 | A1 | 3/2005 | Hiroyama et al. | |
| 2005/0054448 | A1 | 3/2005 | Frerking et al. | |
| 2005/0059457 | A1 | 3/2005 | Rothschild et al. | |
| 2005/0059493 | A1 | 3/2005 | Tyson et al. | |
| 2005/0059494 | A1 | 3/2005 | Kammler | |
| 2005/0064935 | A1 | 3/2005 | Blanco | |
| 2005/0064939 | A1 | 3/2005 | McSheffrey et al. | |
| 2005/0071023 | A1 | 3/2005 | Gilliland et al. | |
| 2005/0075983 | A1 | 4/2005 | St. Denis | |
| 2005/0081623 | A1 | 4/2005 | Frank | |
| 2005/0086286 | A1 | 4/2005 | Gatto et al. | |
| 2005/0090313 | A1 | 4/2005 | Rowe | |
| 2005/0096114 | A1 | 5/2005 | Cannon et al. | |
| 2005/0096121 | A1 | 5/2005 | Gilliland et al. | |
| 2005/0096133 | A1 | 5/2005 | Hoefelmeyer et al. | |
| 2005/0097342 | A1 | 5/2005 | Gatto et al. | |
| 2005/0101370 | A1 | 5/2005 | Lind et al. | |
| 2005/0113172 | A1 | 5/2005 | Gong | |
| 2005/0114272 | A1 | 5/2005 | Herrmann et al. | |
| 2005/0119045 | A1 | 6/2005 | Fujimoto | |
| 2005/0119046 | A1 | 6/2005 | Fujimoto | |
| 2005/0137012 | A1 | 6/2005 | Michaealson | |
| 2005/0148385 | A1 | 7/2005 | Michaealson | |
| 2005/0159218 | A1 | 7/2005 | Blanco | |
| 2005/0261060 | A1 | 11/2005 | Nguyen et al. | |
| 2005/0261061 | A1 | 11/2005 | Nguyen et al. | |
| 2005/0277469 | A1 | 12/2005 | Pryzby et al. | |
| 2005/0282629 | A1 | 12/2005 | Gagner | |
| 2005/0282631 | A1 | 12/2005 | Bonney et al. | |
| 2005/0282638 | A1 | 12/2005 | Rowe | |
| 2006/0009273 | A2 | 1/2006 | Moshal | |
| 2006/0009280 | A1 | 1/2006 | Joshi et al. | |
| 2006/0019747 | A1 | 1/2006 | Loose et al. | |
| 2006/0019750 | A1 | 1/2006 | Beatty | |
| 2006/0030409 | A1 | 2/2006 | Lechner et al. | |
| 2006/0031829 | A1 | 2/2006 | Harris et al. | |
| 2006/0035705 | A1 | 2/2006 | Jordan et al. | |
| 2006/0036573 | A1 | 2/2006 | Watanabe et al. | |
| 2006/0039132 | A1 | 2/2006 | Chen | |
| 2006/0040732 | A1 | 2/2006 | Baerlocher et al. | |
| 2006/0046839 | A1 | 3/2006 | Nguyen | |
| 2006/0063575 | A1 | 3/2006 | Gatto et al. | |
| 2006/0073881 | A1 | 4/2006 | Pryzby et al. | |
| 2006/0084502 | A1 | 4/2006 | Downs et al. | |
| 2006/0089190 | A1 * | 4/2006 | Bryant et al. | 463/20 |
| 2006/0094508 | A1 | 5/2006 | D'Amico et al. | |
| 2006/0143085 | A1 | 6/2006 | Adams et al. | |
| 2006/0148561 | A1 | 7/2006 | Moser | |
| 2006/0194633 | A1 | 8/2006 | Paulsen | |
| 2006/0287107 | A1 | 12/2006 | Okada | |
| 2007/0006708 | A1 | 1/2007 | Laakso | |
| 2007/0021185 | A1 | 1/2007 | Walker et al. | |

FOREIGN PATENT DOCUMENTS

| | | |
|---|---|---|
| EP | 0 843 272 | 5/1998 |
| EP | 0 945 837 | 9/1999 |
| EP | 0 978 809 | 2/2000 |
| EP | 0 993 847 | 4/2000 |
| EP | 0 997 856 | 5/2000 |
| EP | 0 997 857 | 5/2000 |
| EP | 1 000 642 | 5/2000 |
| EP | 1 004 970 | 5/2000 |
| EP | 1 079 345 | 2/2001 |
| EP | 1 225 565 | 7/2002 |
| EP | 1 199 690 | 2/2004 |
| EP | 1 439 507 | 3/2005 |
| GB | 2 098 778 | 11/1982 |
| GB | 2 201 279 | 8/1988 |
| JP | 11197292 | 12/1997 |
| JP | 11216221 | 8/1999 |
| JP | 2000107466 | 4/2000 |
| JP | 2000296209 | 10/2000 |
| JP | 2001062029 | 3/2001 |
| JP | 2003290422 | 10/2003 |
| WO | WO 9732285 | 9/1997 |
| WO | WO 98/35309 | 8/1998 |
| WO | WO 99/41718 | 8/1999 |
| WO | WO 99/65579 | 12/1999 |
| WO | WO 00/25281 | 5/2000 |
| WO | WO 01/61437 | 8/2001 |
| WO | WO 02/17295 | 2/2002 |
| WO | WO 2004/014501 | 2/2004 |
| WO | WO 2004/025583 | 3/2004 |
| WO | WO 2005/026894 | 3/2005 |
| WO | WO 2005/113089 | 12/2005 |
| WO | WO 2005/113091 | 12/2005 |
| WO | WO 2005/114598 | 12/2005 |
| WO | WO 2005/117647 | 12/2005 |
| WO | WO 2005/120127 | 12/2005 |
| WO | WO 2006/017036 | 2/2006 |
| WO | WO 2006/017445 | 2/2006 |
| WO | WO 2007/044175 | 4/2007 |

OTHER PUBLICATIONS

Article, "A Salute to Game Shows—The Price Is Right—Pricing Games—Three Strikes," p. 8 of 9, [online], [retrieved on Aug. 16, 2000]. Retrieved from the Internet: <http://ben-schumin.simplenet.com/game-shows/shows/price-is-right/pricing-games-4.htm>.

Article, "Frankie & Annette's Beach Party Bally Gaming," published by Strictly Slots, Dec. 2001.

Article, "Megaman X's Soundcard History Museum," [online] pp. 1-5, [retrieved on May 11, 2000] retrieved on Internet at <http://digitalparadise.cgocable.ca/MegaMan_X/Soundcards>.

Article, "Microprocessor Report," pp. 2, 12-17, published by Micro Design Resources on Mar. 25, 1996.

Article, "Monopoly Movers & Shakers Williams/WMS Gaming," published by Strictly Slots publication in Jul. 2000.

Bally Gaming, Inc., "Frankie & Annette's Beach Party (EVO Hybrid),"[online] [retrieved on Jan. 9, 2004]. Retrieved from the internet <URL: http://www.ballygaming.com/gameroom/games.asp?gameID=664>.

Bally Live-Server Based Gaming brochure, written by Bally Gaming Systems, published in 2006.

Banana-Rama Brochure written by Silicon Gaming, available prior to 2000.

Bonusing Solutions without Limits brochure, written by Bally Gaming Systems, published in 2005.

Break the Spell Brochure written by Atronics, published in 1999.

Brochure of Bally Gaming, Inc., "EVO HYBRID Frankie & Annette's Beach Party," published by Bally Gaming, Inc. in the year 2001 on or before December thereof.

Brochure of IGT, "Leopard Spots, Double Diamond 2000, Little Green Men, Elephant King, I Dream of Jeannie," available in Oct. 1999.

Brochure of IGT, "Run for Your Money S-Plus Limited," published in the year 1998 on or before Dec. thereof.

Brochure of IGT, "Top Dollar S-Plus Limited," published in the year 1998 on or before December thereof.

Brochure of IGT, "Totem Pole," written by IGT, available in the year 1997, on or before December thereof.

Brochure of IGT, "Wheel of Fortune," published in the year 1998 on or before December thereof.

Brochure of WMS Gaming Inc., "Meet the Next Generation of Monopoly Slot Machines from WMS Gaming!" published by Hasbro, Inc. in the year 1999 on or before December thereof.
Brochure of WMS Gaming Inc., "Monopoly Chairman of the Board," published by Hasbro, Inc. in the year 1999 on or before December thereof.
Brochure of WMS Gaming Inc., "Monopoly Once Around," published by Hasbro, Inc. in the year 1998 on or before December thereof.
Brochure of WMS Gaming Inc., "Monopoly Reel Estate," published by Hasbro, Inc. in the year 1998 on or before December thereof.
Brochure of WMS Gaming Inc., "Movers & Shakers," published by Hasbro, Inc. in the year 2000 on or before December thereof.
Cash Chameleon Brochure written by Aristocrat, published in Oct. 2000.
Chutes and Ladders CD-ROM Game, Hasbro Interactive, Inc., available in the year 1999 on or before December thereof.
Cliff Hanger [online], [retrieved on Mar. 21, 2001]. Retrieved from the Internet, <URL: http://www.geocities.com/Hollywood/Set/9859/tpir10.html>.
Cliff Hangers [online], [retrieved on Mar. 21, 2001]. Retrieved from the Internet, <URL: http://members.aol.com/schmoliktpir/hangers.html>.
Cliff Hangers Bonus and Plinko Bonus advertisement published prior to Sep. 9, 2003.
Definition of Pitch, Merriam-Webster's Collegiate Dictionary, Tenth Edition, p. 886, 1999, on or before December thereof.
Description of Accelerated Credit Roll-Up in Gaming Machines written by IGT, available in the year 1999 on or before December thereof.
Description of Action Prompts in Gaming Machines, written by IGT, available in the year 1999 on or before December thereof.
Description of Animating Symbol Feature in Gaming Machines, available prior to 2000.
Description of Last Sound in Credit Roll-Up in Gaming Machines written by IGT, available in the year 2000 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.
Description of Tempo Change in Gaming Machines written by IGT, available in the year 2000 on or before December thereof.
Description of Verbal Wager Feature in "Dick Clark" Gaming Machine written by IGT, available in the year 2000 on or before December thereof.
Description of Volume Control Functions in Gaming Machines written by IGT, available in the year 1999 on or before December thereof.
Fried, Ian, CNET News.com, Microsoft Releases XP for Slot Machines, [online], [retrieved on Nov. 28, 2011]. Retrieved from the Internet <URL:http://news.com.com/XP+for+slot+machines%2C+ATMs+released/2100-1040_3-276302.html>.
Game King Series Advertisement, written by IGT, published in 1997.
Game King Series Advertisement, written by IGT, published in 1998.
Game King Triple Play Draw Poker Advertisement, written by IGT, published in 1998.
http://crystal.capana.org.au/ghansper/midi_introduction/midi_file_format.html.
IGT, "Elephant King,"[online], [retrieved on Mar. 21, 2001]. Retrieved from the Internet URL:http://www.igt.com/games/new_games/elephant.html.
Jazzy Jackpots Advertisement written by Atronic, published in 2000.
Jazzy Jackpots Article written by Strictly Slots, published in Mar. 2001.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Office Action dated Jan. 11, 2007 for U.S. Appl. No. 10/826,465.
Office Action dated May 16, 2007 for U.S. Appl. No. 10/826,465.
Office Action dated Nov. 28, 2007 for U.S.Appl. No. 10/826,465.
Office Action dated Oct. 26, 2005 for U.S. Appl. No. 10/659,093.
Office Action dated May 9, 2006 for U.S. Appl. No. 10/659,093.
Office Action dated Mar. 13, 2007 for U.S. Appl. No. 10/659,093.
Office Action dated Sep. 25, 2007 for U.S. Appl. No. 10/659,093.
Office Action dated Jul. 24, 2008 for U.S. Appl. No. 10/659,093.
Office Action dated Jan. 16, 2009 for U.S. Appl. No. 10/659,093.
Office Action dated Jul. 16, 2009 for U.S. Appl. No. 10/659,093.
Office Action dated Nov. 26, 2008 for U.S. Appl. No. 10/953,123.
Office Action dated May 13, 2009 for U.S. Appl. No. 10/953,123.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
SB Products—The Next Big Innovation, printed from www.igt.com in Aug. 2006.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
Server Based: Other Possibilities Article; published by www.casinocenter.com in May 2006.
Slots 2003, written by Melissa Raimondi, published in Jan. 2003.
The Java™ Tutorial, "What Can Java Technology Do?" [online]. pp. 1-2 [retrieved on Oct. 16, 2000]. Retrieved from the Internet URL:http://java.sun.com/docs/books/tutorial/getStarted/i.../definition.htm.
The MIDI File Format, [online]. pp. 1-10 [retrieved on Dec. 28, 2001]. Retreived from the Internet URL.
The Price is Right Featuring Plinko advertisement written by IGT, published in 2001.
The Price is Right Plinko written by IGT, published in Dec. 2001.
Transferring Gaming brochure, written by Cyberview Technology, published in 2006.

* cited by examiner

| FIG.5A |
|---|
| FIG.5B |

FIG.9

REASONS GAME SWITCHES INTERFACES

- SWITCH MADE RANDOMLY NOT BASED ON GAME EVENT 182
- SWITCH MADE RANDOMLY BASED ON GAME EVENT 184
- SWITCH MADE BASED ON PLAYER'S WAGER 186
- SWITCH MADE BASED ON CREDITS ACCUMULATED OR CREDITS LOST 188
- SWITCH MADE BASED ON NUMBER OF TIMES PLAYER HAS PLAYED GAME CONSECUTIVELY 190
- SWITCH MADE BASED ON A TABULATION MAINTAINED BY A PLAYER TRACKING CARD 192
- SWITCH MADE BASED ON GAME THEME (E.G. REEL SYMBOLS CHANGE TO FOLLOW STORY LINE OF STORY ASSOCIATED WITH GAME THEME) 194

FIG.10

POSSIBLE VARIABLES THAT CHANGE WITH OR BASED ON CHANGE OF INTERFACE

- PAYTABLE VOLITILITY (202)
- PAYBACK PERCENTAGE (E.G. COULD HAVE "BONUS" INTERFACE), DIFFERING PAYOUTS (204)
- WAGER REQUIREMENT FOR ELIGIBILITY, E.G., FOR POSSIBLE PROGRESSIVE PAYOUT, JACKPOT WIN, BONUS GAME PLAY, OR ELIGIBILITY GENERATED (206)
- BONUS TRIGGERING SYMBOL OR COMBINATION LIKELIHOOD, LIKELIHOOD OF GENERATING, JACKPOT, PROGRESSIVE, PERSISTENCE INCREMENT, BONUS GAME(S) (208)
- TOTAL NUMBER OF DIFFERENT SYMBOLS DIFFERS IN SETS (210)
- PROPORTION AND/OR ORDERING OF SYMBOLS OR REEL STRIPS (212)

GAMING DEVICE HAVING MULTIPLE SELECTABLE DISPLAY INTERFACES BASED ON PLAYER'S WAGERS

PRIORITY CLAIM

This application is a divisional of, claims priority to and the benefit of U.S. patent application Ser. No. 10/953,123, filed on Sep. 28, 2004, which is a continuation-in-part of, claims priority to and the benefit of U.S. patent application Ser. No. 10/659,093, filed Sep. 9, 2003, which is a continuation-in-part application of U.S. patent application Ser. No. 09/602,331, filed Jun. 23, 2000, now U.S. Pat. No. 6,731,313, the entire contents of which are incorporated herein.

CROSS REFERENCE TO RELATED APPLICATIONS

This application is related to the following commonly-owned co-pending patent applications: "GAMING DEVICE HAVING MULTIPLE SELECTABLE DISPLAY INTERFACES," U.S. patent application Ser. No. 10/659,093; and "GAMING DEVICE HAVING TOUCH ACTIVATED ALTERNATING OR CHANGING SYMBOL," U.S. patent application Ser. No. 10/826,465, now U.S. Pat. No. 7,526,736.

BACKGROUND OF THE INVENTION

The purpose of indicia on paper is to convey information. While this is also true for visual effects in wagering gaming devices, images and indicia displayed by a wagering game's display device have the additional extremely important purpose of providing or increasing entertainment for the player. If some players are not entertained, they will not play a wagering gaming machine. Also, more recently, players have come to expect more entertainment from gaming devices, for example, those having video displays rather than the older mechanical displays and those having bonus games.

Since one of the primary purposes of a wagering gaming device is to provide entertainment, there is a major challenge for gaming device manufacturers to develop new games that increase the amount of entertainment provided to players. Players are entertained not only by the risk of a wager but also by attractive, engaging, interesting, fun, new and different visual, audio, and audio-visual effects. For those reasons, the gaming industry is constantly seeking to make advancements in the displays including graphics and other visual effects provided to the player. If one views a wagering gaming device as only a wagering mechanism, the display or graphical aspect of the wagering gaming device may appear to have little value. However, by remembering that a wagering gaming device is an entertainment device as well as, or in addition to, a wagering device, the importance of an interesting and exciting graphical display and the technical challenges faced by gaming personnel to develop such displays becomes apparent. Simultaneously, to maintain certain player's interest in a gaming machine for a significant period of time, such gaming machines must be highly interesting, entertaining and enjoyable.

Increased entertainment, in combination with other elements such as providing messages and/or awards to players, provides a useful, concrete and tangible result provided by a wagering gaming device. It is therefore desirable to provide new, fun and exciting ways to display a primary or base game or a secondary or bonus game of a gaming device, to entertain the players and to hold a player's interest.

SUMMARY OF THE INVENTION

One embodiment of the present invention includes an apparatus and method for displaying multiple gaming device interfaces for the same game of the present invention. In one embodiment, the game is the game of slot although other wagering games are also within the scope of the present invention. In one embodiment, the exact same game is played using one of a plurality of different display interfaces. In one embodiment, the gaming device enables the player to select which interface to play. The player can play the game for a while using one interface and then switch interfaces to provide a fresh display or to try to change the player's luck. The player can then switch back to the original interface or select a brand new interface depending upon how many interfaces the gaming device is adapted to provide.

The different interfaces include the same number of different symbols in one embodiment. For example, each interface could include thirty different symbols, wherein each symbol of an interface is functionally identical to, corresponds to or relates to a symbol in each of the different interfaces. Of the functionally identical, corresponding or related symbols, some can be symbols common to more than one or all of the interfaces. For example, a bonus symbol or a wild symbol can be common to more than one or all the interfaces and perform the identical function. Other functionally identical, corresponding or related symbols are different but have similar indicia. For example, a symbol displaying a human character in one interface can correspond to a different symbol displaying a different human character in another interface. A first kind of fruit in one interface can correspond to a second kind of fruit in a second interface, etc.

Other functionally identical, corresponding or related symbols of different interfaces bear no likeness to one another. They are functionally identical or related however because they occupy the same spot in a paytable common to each of the interfaces and thus have exactly the same function in the game. For instance, if bananas in one interface correspond to flying saucers in a second interface, which both correspond to fish in a third interface, and if three bananas appear on the first three reels along a payline pays fifty credits in the first interface, then three flying saucers and three fish appearing in the same positions of the reels in their respective interfaces also each pay fifty credits.

The present invention includes different methods for activating the change of an interface. In one embodiment, the player changes the interfaces as desired. An input device can be provided that enables the player to toggle through the interfaces until reaching a desired interface. This input device is displayed in one embodiment on the display device and selectable by a player through a touch screen. Alternatively, the input can be a mechanical button on the gaming device. In another embodiment, an input device for each interface is provided, so that the player can simply touch a dedicated button to display and play a desired interface. Those dedicated input devices can be provided in one alternative embodiment on a call-up menu, for example, in combination with the paytable. Here, the players can view the paytable, each of the symbols associated with each of the interfaces, and then select a desired interface via a dedicated input device.

In an alternative embodiment, the gaming device automatically changes display interfaces without the player's input. Such automatic change can occur: (i) randomly based on a non-game event; (ii) randomly based on a game event; (iii) based on the player's wager or a component thereof; (iv) based on credits lost or accumulated; (v) based on a number of times the player has played the gaming device consecutively; (vi) based on a tabulation maintained by a player tracking card; (vii) based on a game theme (e.g., to follow the story line of the game theme); or (viii) any combination thereof.

In another alternative embodiment, a component of the game varies from interface to interface. That is, the game changes in one or more ways based on the interface chosen and played. For example, a change in interfaces can lead to a change in: (i) paytable volatility; (ii) payback percentage; (iii) bonusing; (iv) wager requirement for eligibility for bonus game, jackpot win, persistence meter increment, progressive payout, etc.; (v) triggering event for one or more bonus games; (vi) total number of different symbols in sets, e.g., one interface has ten different symbols while other interface has twelve; (vii) proportion and/or ordering of symbols on the reel strips; and (viii) any combination thereof.

The gaming device employing the multiple interfaces also keeps a log of games with which the player can review if the player has a question about a prior game result. In one implementation, the gaming device stores the previous ten game plays. The gaming device stores information such as, the player's wager, the wager components, the outcome on each payline and the total outcome, such as player wins nothing, player wins less than wager, player wins wager amount, and player wins more than wager amount. In one embodiment, the log also records the particular interface used in each game. The player can therefore review which interface was used, e.g., ten games ago, seven games ago, five games ago, etc.

In a further embodiment the amount or type of the player's wager, or a component thereof, causes the interface presented to the player and/or paytable of the game to change. The different wager amounts may be any suitable different wagers such as wagers on different numbers of paylines, different amounts wagered on paylines, different numbers of games, different wagers on the games, different numbers of hands, different wagers on the hands, or any other suitable components. In one example embodiment, different wagers on different amounts of paylines (such as 3 paylines wagered on or 5 paylines wagered on) have different interfaces associated with such different wager amounts. In another embodiment, different interfaces are associated with different wager amounts for each selected payline. Thus, when a player wagers different amounts on one or more of the paylines, the gaming device employs the interface and the paytable associated with that amount wagered per payline. The gaming device is operable to accept such different wagerable amounts and includes in one embodiment at least two different primary game interfaces and at least two different paytables for the primary game. When the player wagers one of the different amounts, the gaming device causes the interface associated with that amount to be displayed to the player. A change in wager amount can lead to a change in the interface, such as a change in the: (i) display color; (ii) display symbols; (iii) symbol background; (iv) other interface components; or (v) any combination thereof. Therefore, the player can control which interface is presented to the player and the paytable employed by changing the wager amount or the way in which the wager is placed (such as on different components).

It is therefore an advantage of the present invention to provide a fun and exciting wagering game.

It is another advantage of the present invention to provide a fun and exciting gaming device display.

It is a further advantage of the present invention to provide a gaming device having different player selectable game interfaces for the same game.

It is still another advantage of the present invention to provide a gaming device having different automatically changing game interfaces.

It is still a further advantage of the present invention to provide a gaming device having different automatically changing game interfaces that follow a story line of a theme of the gaming device.

Moreover, it is an advantage of the present invention to provide a gaming device having different game interfaces, but wherein the game plays and pays the same.

Still further, it is an advantage of the present invention to provide a gaming device having different game interfaces, and wherein the game plays and/or pays differently for different game interfaces.

Another advantage of the present invention is to provide a gaming device having different game interfaces based on different player wager amounts or different types of wagers, wherein the player can cause a change in the interface by making a different wager.

Another advantage of the present invention is to provide a gaming device having different paytables, wherein the player can cause a change in the paytable by making a different wager.

Additional features and advantages of the present invention are described in, and will be apparent from, the following Detailed Description of the Invention and the figures.

BRIEF DESCRIPTION OF THE FIGURES

FIG. 9 is a non-inclusive table of different scenarios for why the game could automatically switch game interfaces of the present invention without a player input.

FIG. 10 is a non-inclusive table of different variables that could vary from game interface to game interface of the present invention.

DETAILED DESCRIPTION OF THE INVENTION

The Gaming Device Generally

Figure 1A:
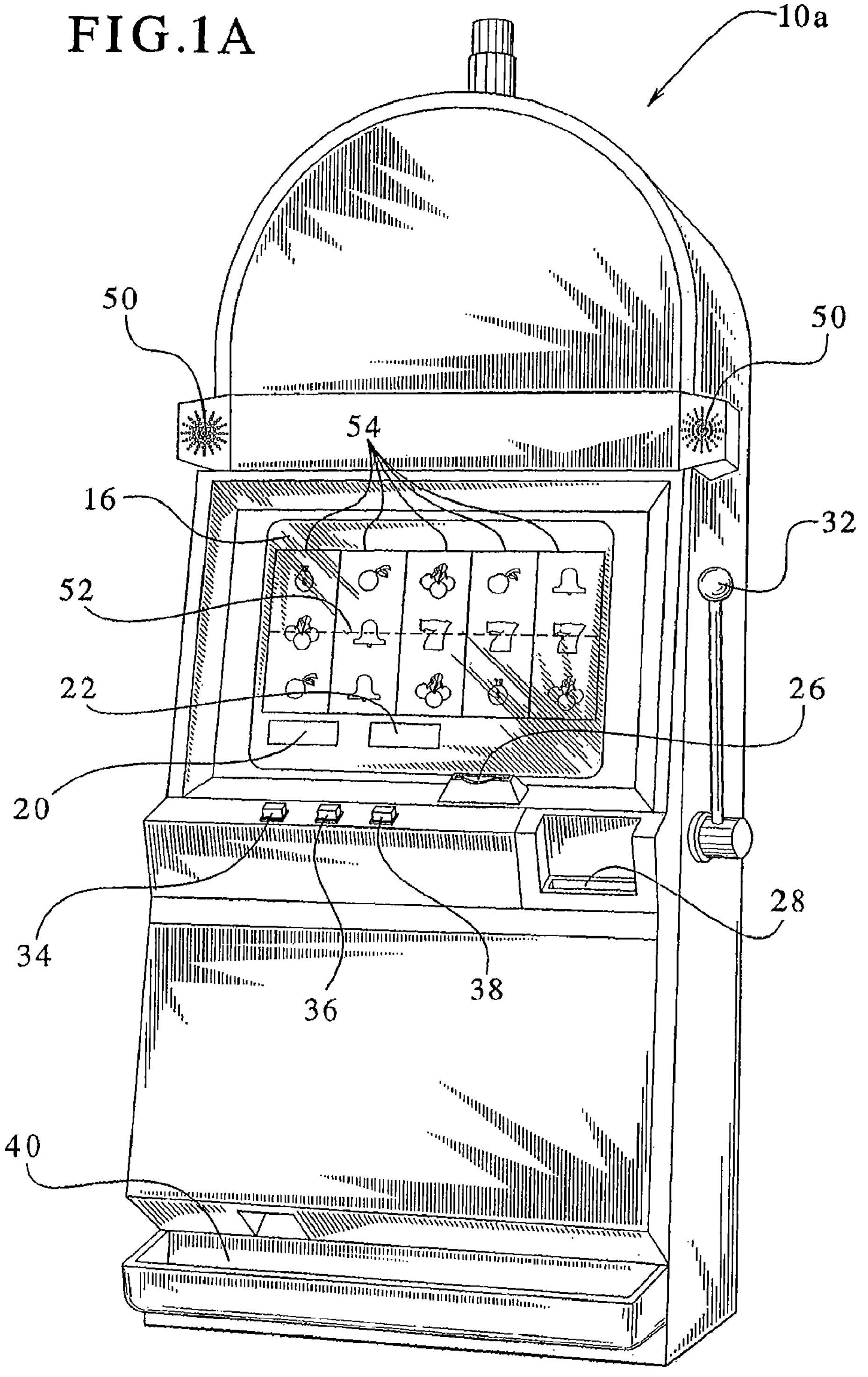
FIGS. 1A and 1B are front perspective views of various embodiments of a slot machine embodiment of the gaming device of the present invention.
Figure 1B:
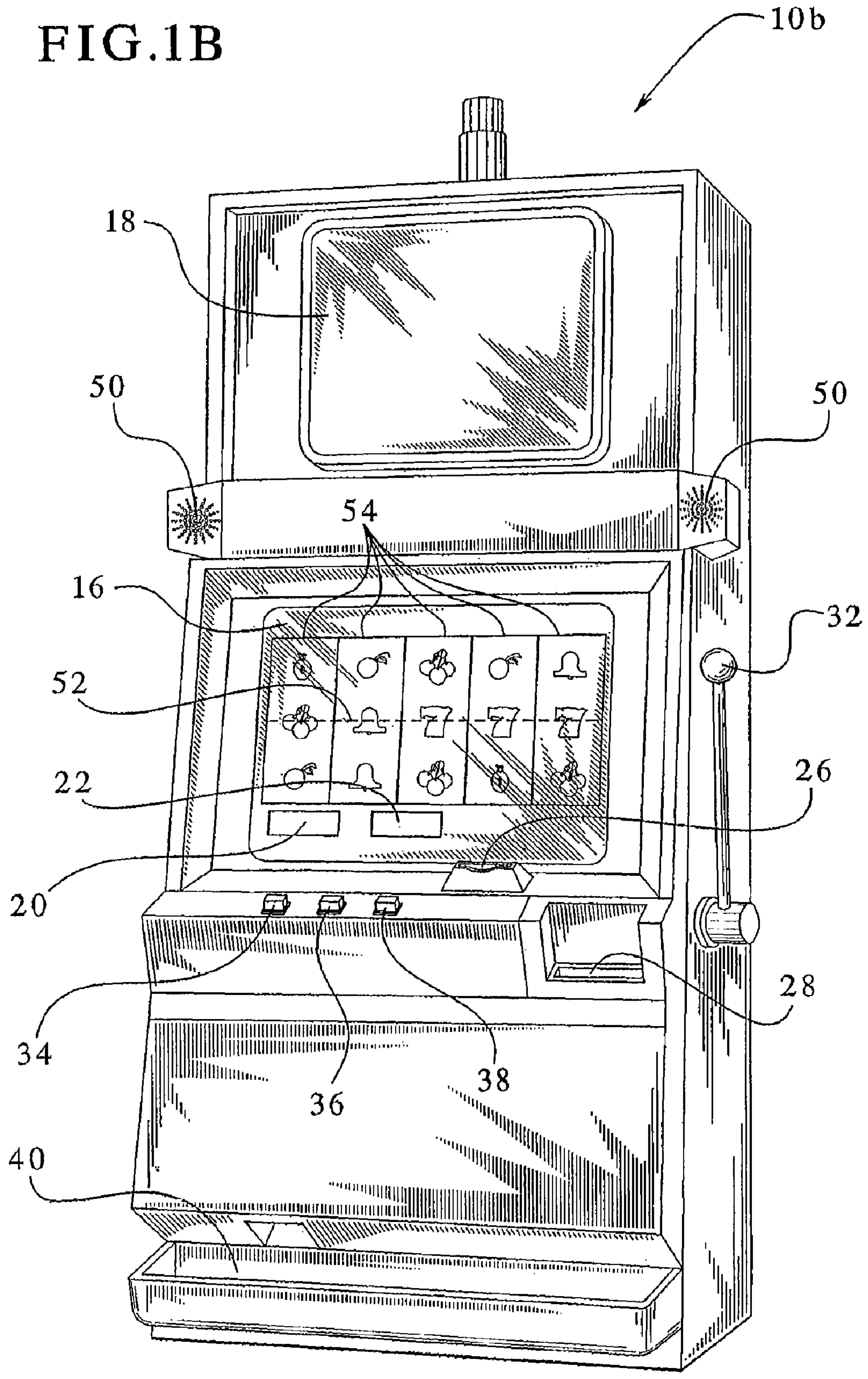

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
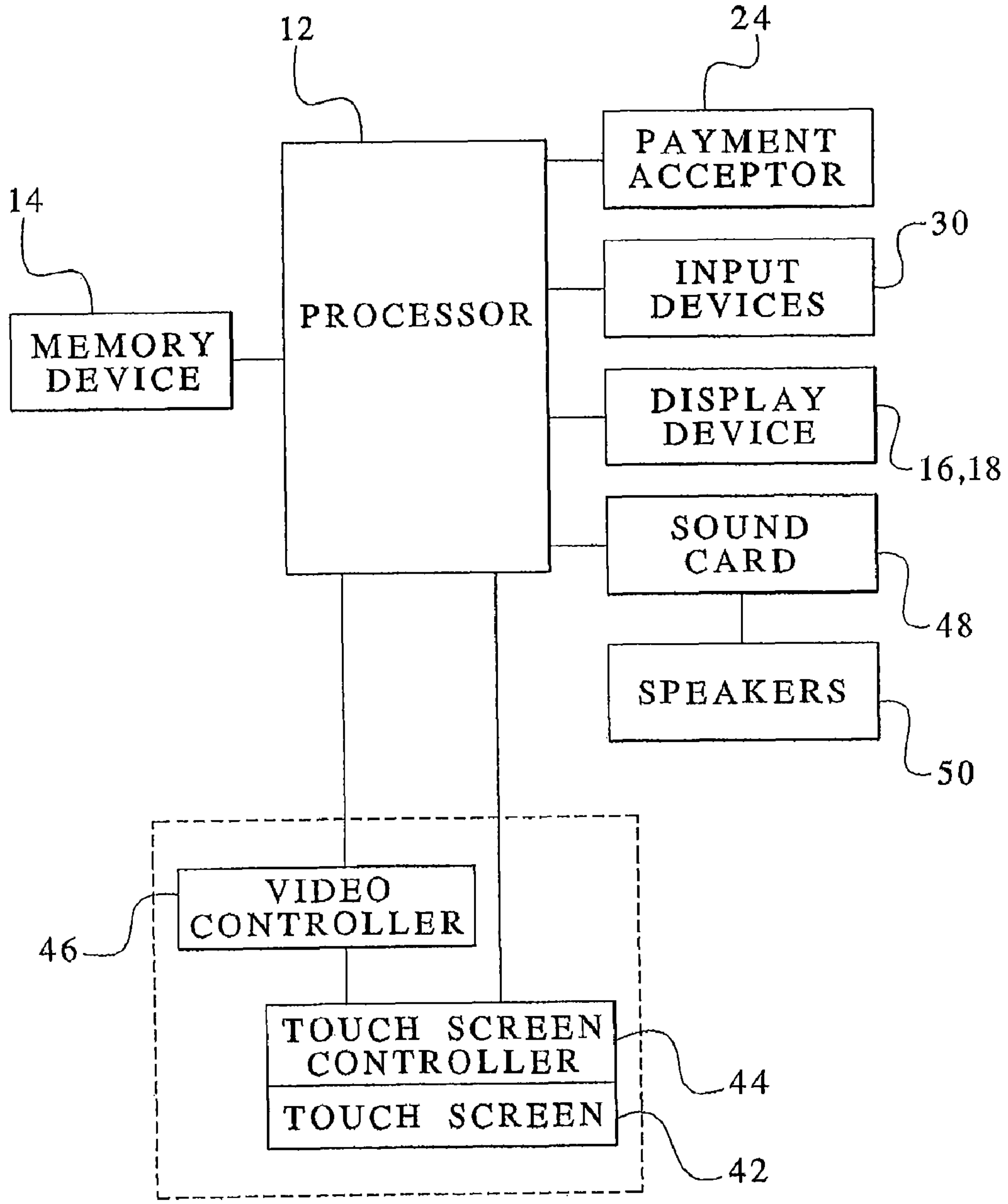
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment, the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. An award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment, each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base, or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
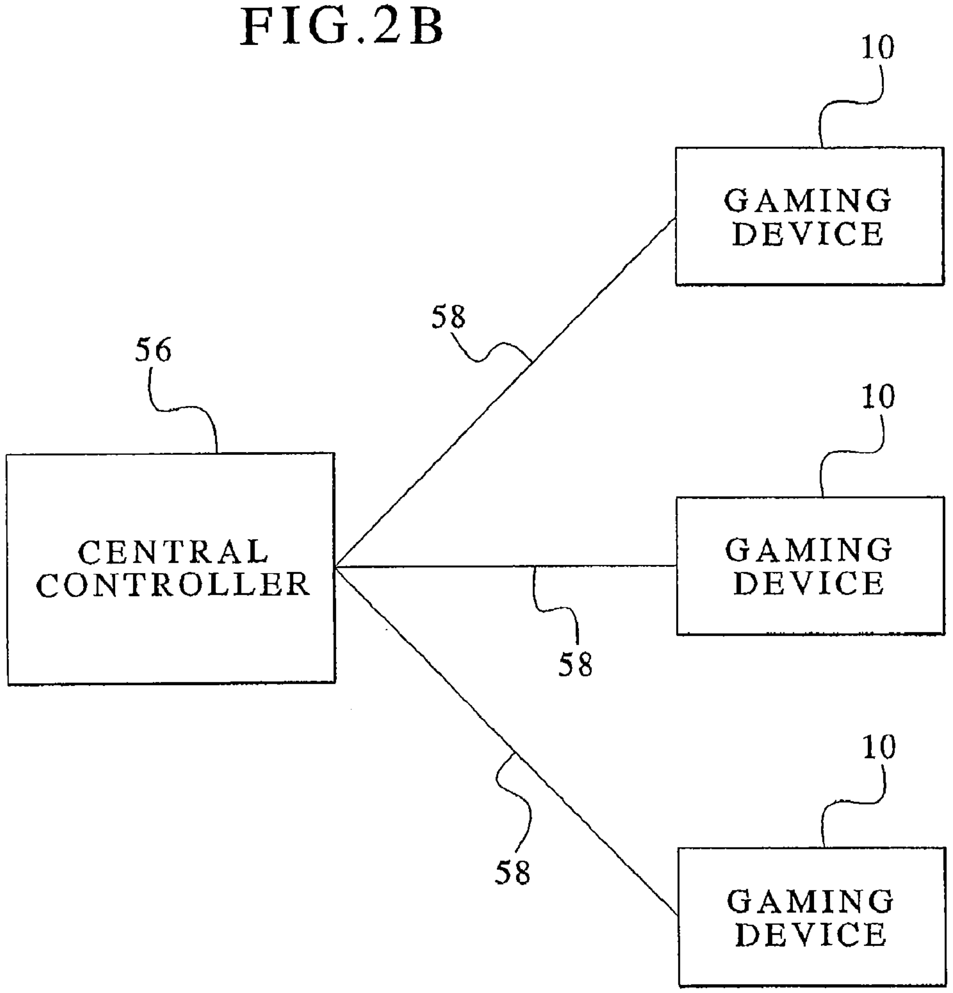
FIG. 2B is a schematic block diagram of various gaming devices employing the wagering game of the present invention, wherein the devices are networked to a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an Internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Multiple Game Interfaces

In one embodiment, the present invention enables the player to selectively choose the display interface that the gaming device displays to the player. As will be discussed below, the interfaces in one embodiment each relate to each other and each relate to a theme of the gaming device. For purposes of illustration, the theme in the illustrated embodiment is that of the "The Price is Right™" game show. It should be appreciated that other types of themes are contemplated, such as movie themes, book themes, famous people, famous historical events, famous music, famous musicians, famous bands, famous and infamous characters as well as other suitable game themes.

Figure 3A:
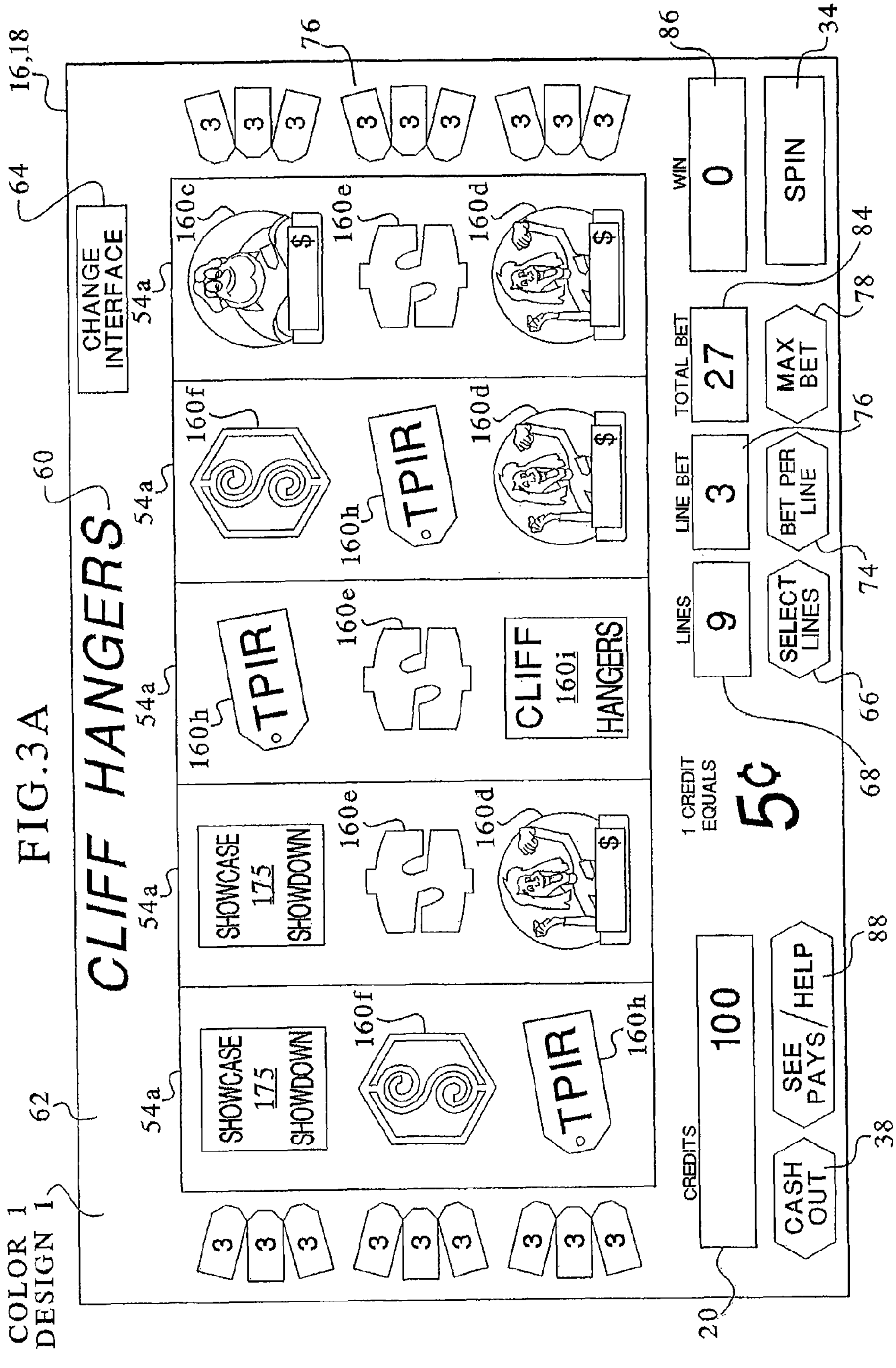
FIGS. 3A, 3B and 3C are elevation views of a display device showing the same game outcome using three different display interfaces of the present invention.
Figure 3B:
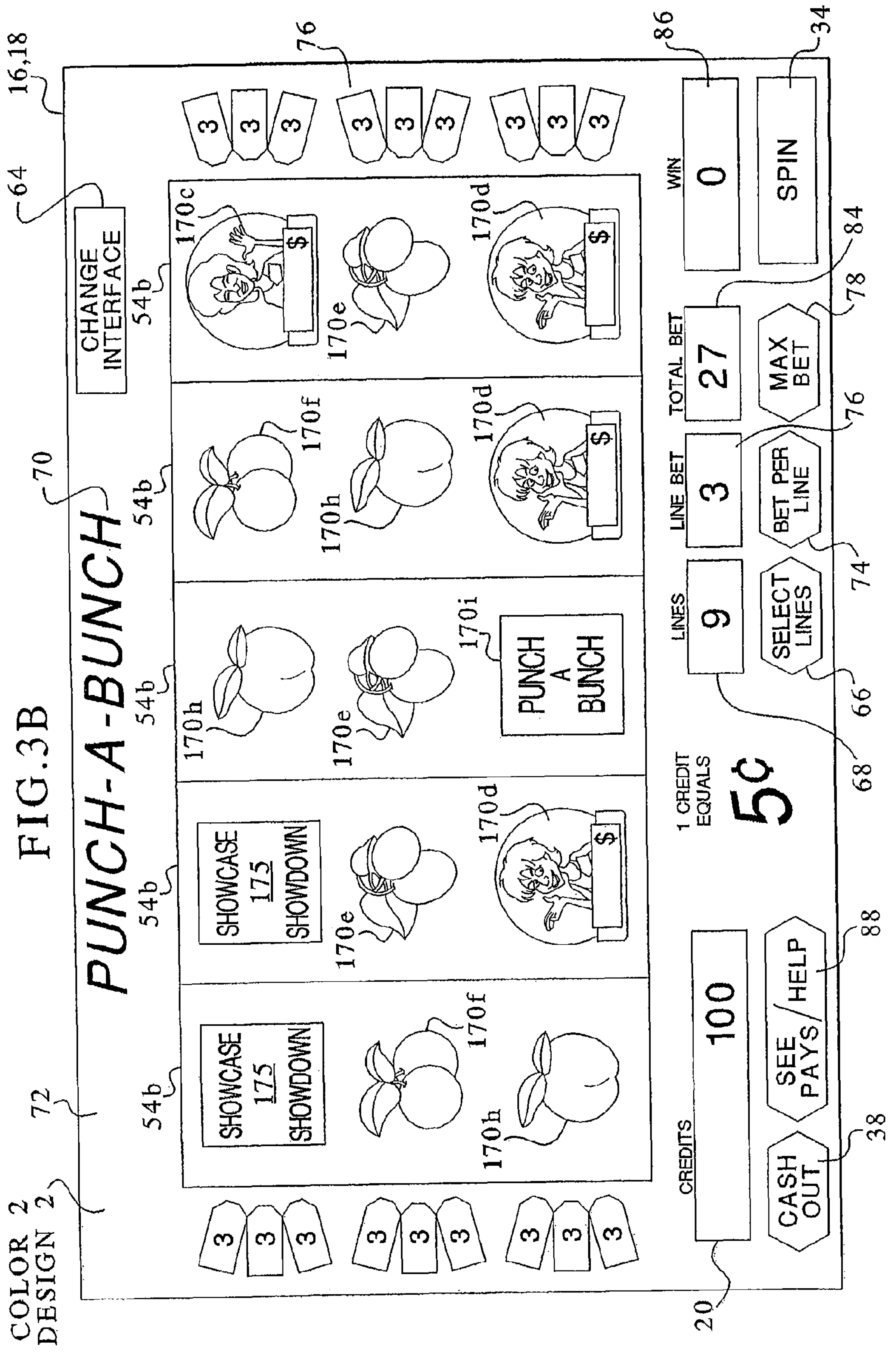
Figure 3C:
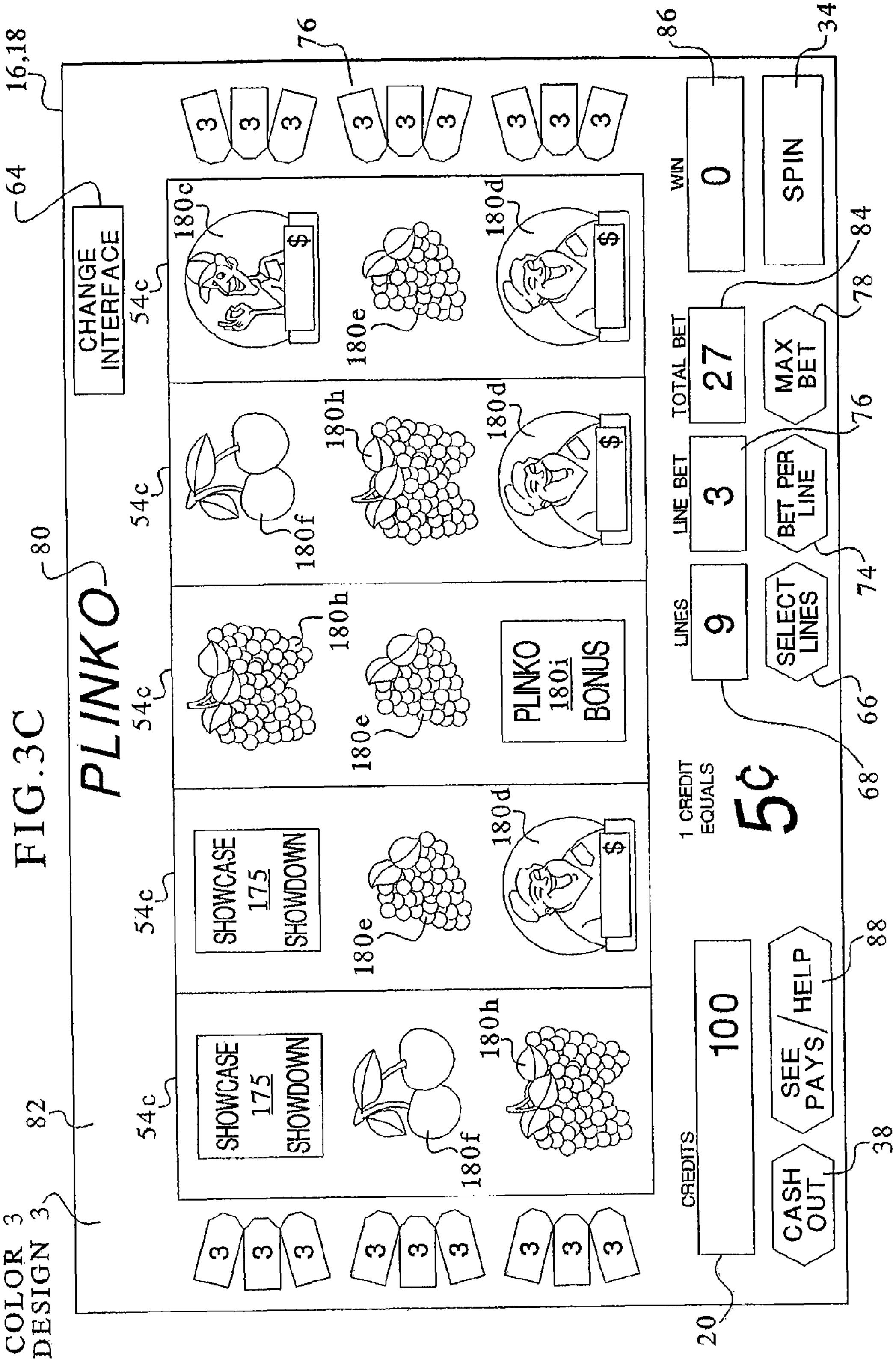

FIGS. 3A to 3C illustrate one embodiment, wherein different interfaces are displayed for the same game having the same payout structure or paytable. As will be discussed in much more detail below, FIGS. 3A to 3C each display the same game. In slot, for example, the different interfaces each display a game with the same variety of symbols, wherein each symbol is provided in the same proportion for each interface and each corresponding symbol of the different interfaces has the same function with respect to the paytable. The paytables for each interface have a corresponding or like winning symbol or symbol combination, wherein each of those symbols or combinations yields the same payout for each interface.

FIG. 3A illustrates the Cliffhanger™ game interface. FIG. 3B illustrates the Punch-a-Bunch™ game interface. FIG. 3C illustrates the Plinko™ game interface. Each of those games is a sub-game or title under the main theme of gaming device 10, namely, the Price is Right™ game show.

The Cliffhanger™ interface 60 has a color and design 62 that is different but related to the color and design 72 of the Punch-a-Bunch™ game interface 70 and the color and design 82 of the Plinko™ game interface 80. In one embodiment, the designs or visual features of designs 62, 72 and 82 are the same, but the color scheme changes for each of those designs. Each of the interfaces 60, 70 and 80 includes reels 54. The Cliffhanger™ game interface 60 includes reels 54*a*, the Punch-a-Bunch™ game interface 70 includes reels 54*b*, and the Plinko™ game interface 80 includes reels 54*c* (reels 54*a* to 54*c* are referred to herein collectively as reels 54). Reels 54*a* to 54*c* are the same from the standpoint that each set includes the same number of total symbols and that analogous symbols are provided in the same proportion and in the same order or positions on reels 54 with the same blanks between the symbols. Reels 54*a* to 54*c* on the other hand differ in that the indicia for at least some of the symbols is different, as described in detail below. In these embodiments, a plurality of or all of the symbols are different in the different interfaces.

Each of the interfaces 60, 70 and 80 also includes a change interface input 64. Change interface input 64 in the illustrated embodiment is an area of display device 16 or 18 that cooperates with the touch screen 42 and touch screen controller 44 to send a signal to processor 12. In an alternative embodiment, change interface button 64 is an electromechanical input device, such as buttons 34, 36 and 38. The change interface input 64 enables the player to selectively designate and operate gaming device 10 with a desired interface 60, 70 or 80.

In one embodiment, change interface input 64 toggles between the three interfaces 60, 70 and 80. In an alternative embodiment, a separate interface input can be provided for each of the interfaces 60, 70 and 80, which allows the player to simply press the button of a desired interface to change game operation from the current interface to the new interface. Further, as discussed below, gaming device 10 in one embodiment provides a selectable call-up menu, e.g., a paytable, that displays each of the possible interfaces 60 to 80 to the player and enables the player within that menu to select an interface.

It should be appreciated that any suitable number of different interfaces may be provided. In the illustrated embodiment, the game provides three different interfaces. In other embodiments, two or more than three interfaces are provided. Still further, gaming device 10 can have an overall game theme including sub-themes. The sub-themes can themselves have multiple interfaces. For example, a gaming device having a movie theme can have sub-themes, each of which constitute different parts of the movie. The interfaces can then each relate to a particular moment or scene within one of the sub-themes or portions of the movie.

Interfaces 60 to 80 also include a number of inputs and displays that are specific and common to slot machines. For instance, interfaces 60 to 80 show a select lines input 66 that enables the player to input a number of paylines on which to place a wager. Typical slot machines can have from one to twenty-five paylines. In the illustrated embodiment, the gaming device has nine paylines, as indicated by the nine boxes placed on either side of reels 54. Indicator 68 indicates that the player has currently selected to wager all nine paylines. While input 66 and indicator 68 are shown as being simulated on one of the display devices 16 and 18, it should be appreciated that those items are alternatively provided elsewhere on the cabinet of gaming device 10 in the form of an electromechanical button or indicator. Such is the case with any of the inputs and indicators described hereafter.

In connection with the select lines input 66, interfaces 60 to 80 also include a bet per line input 74 and a line bet indicator 76. The player is able to place different wagers on the lines that have been enabled or wagered upon. The player toggles through the different wagers per paylines via the bet per line input 74. The current bet per payline is shown as three credits per payline in indicator 76. Indicator 76 is also provided in the nine boxes on either side of reels 54, wherein each box represents a different one of the nine total paylines. Here again, those boxes indicate that the player has wagered three credits per payline.

Interfaces 60 to 80 also show a max bet input 78. Max bet input 78 enables the player to press one button and make the highest possible wager for the game. In one embodiment, the highest possible wager per line is five credits. Therefore, the player has currently wagered twenty-seven credits, as shown in total bet meter 84, out of a total of forty-five possible credits.

Interfaces 60 to 80 also provide a spin or play input 34 in simulated form, which begins play of the game as described above. A win meter 86 is also shown, which shows the player a number of credits or an amount of money achieved after every spin of the reels. It should be appreciated that for nine payline, multiple wager per payline games such as those of interfaces 60 to 80, it is possible for the player to win an amount that is less than the player's wager. For example, the player could wager forty-five credits and win only five credits.

The interfaces 60 to 80 also include a help/see pays input 88. Input 88 enables the player to see menu driven screens that are displayed in place of the interfaces 60 to 80. The "help" portion of the menu screens describe certain features of the game, such as the meaning of "total bet", how to use the mechanical buttons and how to start the game. The help menu also explains the operation of other inputs, such as the cash out button 38, the see pays input 88, select paylines input 66, bet per payline input 74, max bet input 78, the spin or play button 34 as well as other necessary items.

Figures 5, 5A:
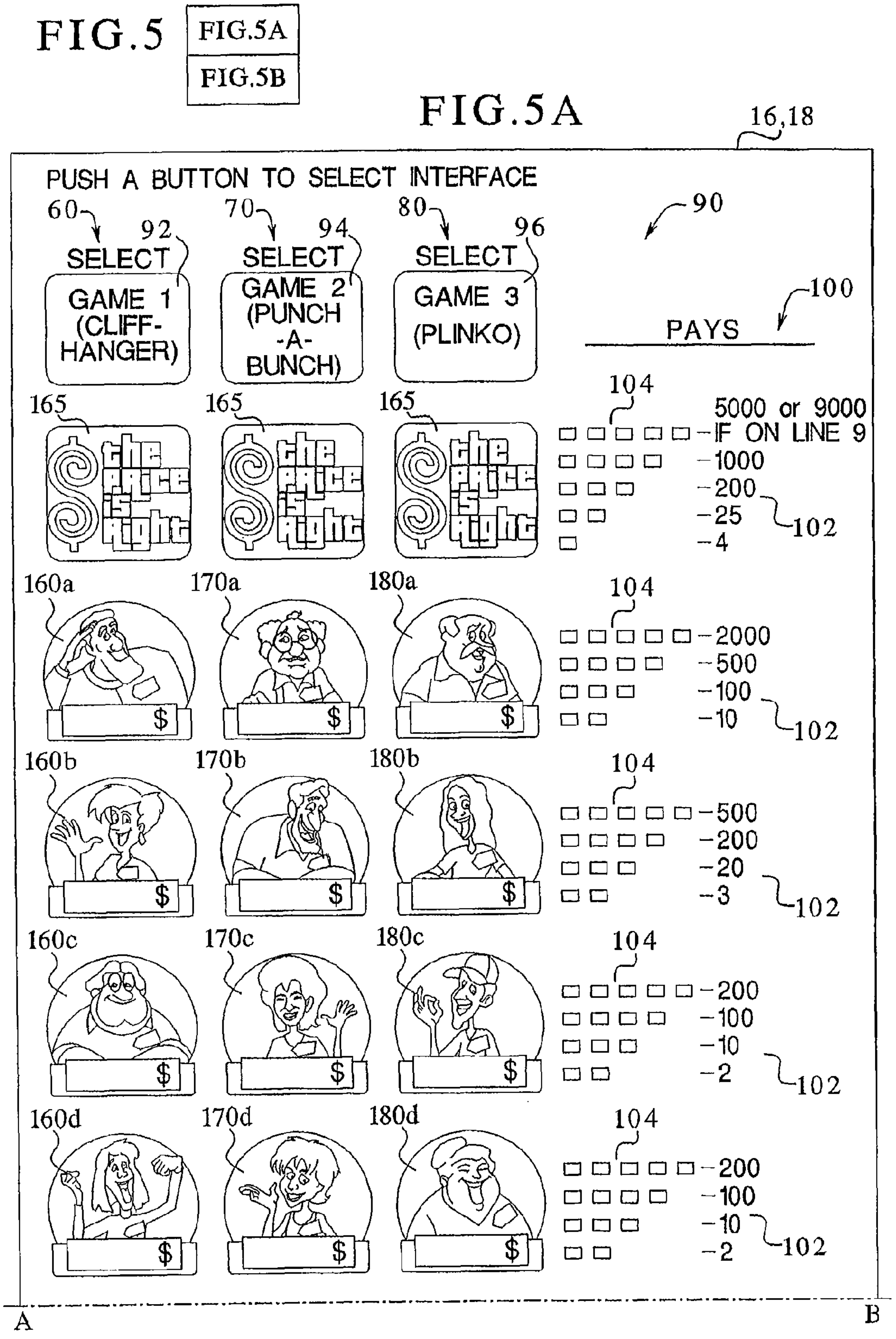
FIG. 5 is an elevation view of a display device showing a paytable linking related symbols of different interfaces and an interface selection menu of the present invention.
Figure 5B:
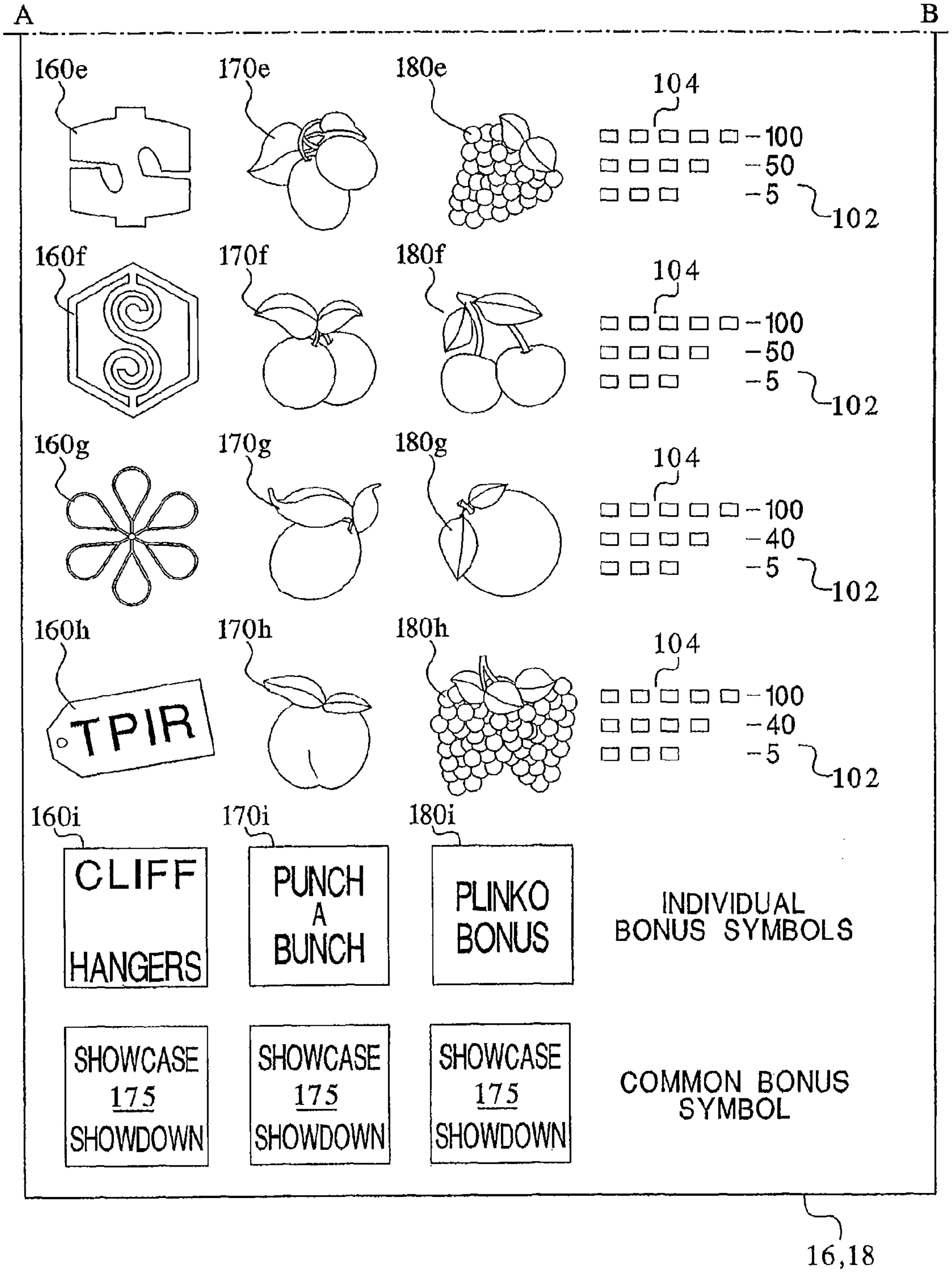

The see pays input 88 results in one embodiment in the display on display device 16, 18 of the information illustrated in FIG. 5. The information illustrated in FIG. 5 shows a menu 90 that enables the player to select the Cliffhanger™ game interface 60, the Punch-a-Bunch™ game interface 70 or the Plinko™ game interface 80. The see pays menu 90 also shows each of the symbols displayed on reels 54 associated with each of the interfaces 60 to 80. Moreover, the see pays menu 90 in FIG. 5 shows each of the different payouts for achieving one or more of certain of the symbols on the reels 54.

FIGS. 3A to 3C show the same game outcome displayed on three different interfaces 60 to 80. That is, reels 54 have spun and stopped revealing symbols that each generate the same outcome for the player. The symbols of the interfaces 60, 70 and 80 are either the same symbols or are corresponding or related symbols. For example, the two symbols in the upper left hand corner of each of the reel outputs of the interfaces 60, 70 and 80 each show the same Showcase Showdown™ symbol 175. That symbol represents a bonus game symbol common to each interface, which possibly takes the player to a bonus game. In other embodiments, a same symbol, such as symbol 175, is part of a winning symbol combination or is a winning symbol by itself.

Following along the top row of symbols of the reels 54 and interfaces 60, 70 and 80, the symbol 160*h* of interface 60 is related to the symbol 170*h* of interface 70, which are both related to symbol 180*h* of interface 80. That is, if the player receives symbol 160*h* on a particular reel 54*a* and in a particular position on that reel, that player would have received symbol 170*h* in the same position and on the like reel 54*b* if the player would have been playing interface 70. The function of these symbols is the same in regard to the paytable. Likewise, the player would have received symbol 180*h* on the like reel 54*c* and in the same position on that reel if the player had been playing interface 80.

In the same manner, the symbol 160*f* of interface 60 in the top row of the fourth reel is related to symbol 170*f* in the like position of interface 70, which are both related to symbol 180*f* in the like position of interface 80. The function of these symbols is the same in regard to the paytable. Symbol 160*c* in the upper right hand corner of the reels 54*a* using interface 60 is related to symbol 170*c* in the like position of interface 70 and is related to symbol 180*c* in the like position of interface 80. The function of these symbols is the same in regard to the paytable.

The remaining rows of symbols on the reels 54 of interfaces 60, 70 and 80 are also either the same or related. The symbols in order 160*f*, 160*e*, 160*e*, 165 and 160*e* of the middle row in interface 60 are related to or correspond to symbols 170*f*, 170*e*, 170*e*, 170*h* and 170*e*, respectively, of interface 70. Those two middle rows of symbols are likewise related to symbols 180*f*, 180*e*, 180*e*, 180*h* and 180*e* of the middle row of interface 80, respectively. The function of these symbols is the same in regard to the paytable.

The bottom row of the symbols of the outcomes of the reels 54 in the different interfaces 60, 70 and 80 are also related. That is, symbols 160*h*, 160*d*, 160*i*, 160*d* and 160*d* of interface 60 are related respectively to the outcome of the bottom row of symbols, namely, symbols 170*h*, 170*d*, 170*i*, 170*d* and 170*d* of interface 70. Moreover, those bottom rows of symbols are in turn related to symbols 180*h*, 180*d*, 180*i*, 180*d* and 180*d* of the bottom row of symbols on the outcome of the reels 54*c* for interface 80. The function of these symbols is the same in regard to the paytable.

Figure 4A:
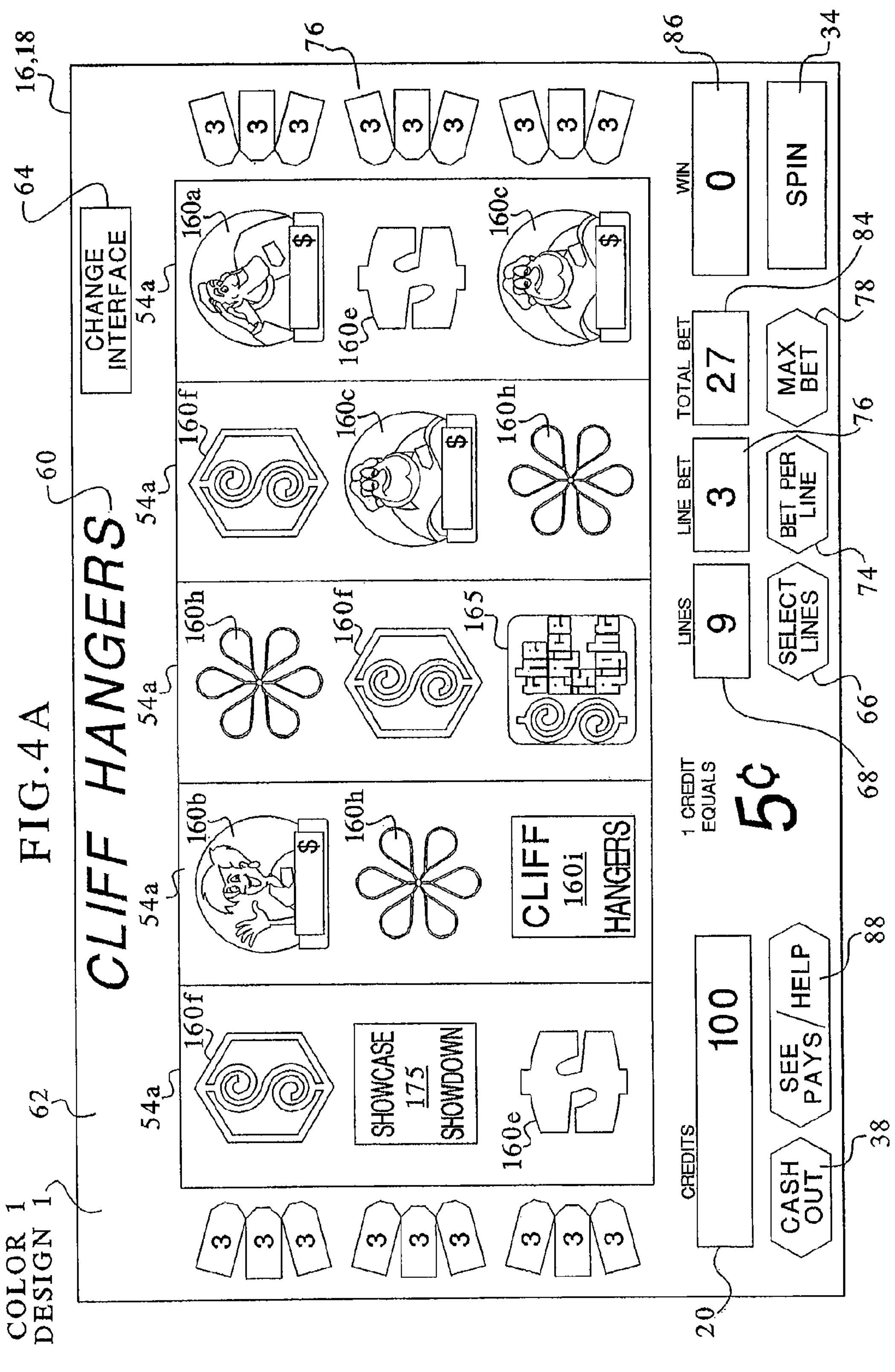
FIGS. 4A, 4B and 4C are elevation views of a display device showing a different game outcome from the one shown in FIGS. 3A to 3C using again three different display interfaces of the present invention.
Figure 4B:
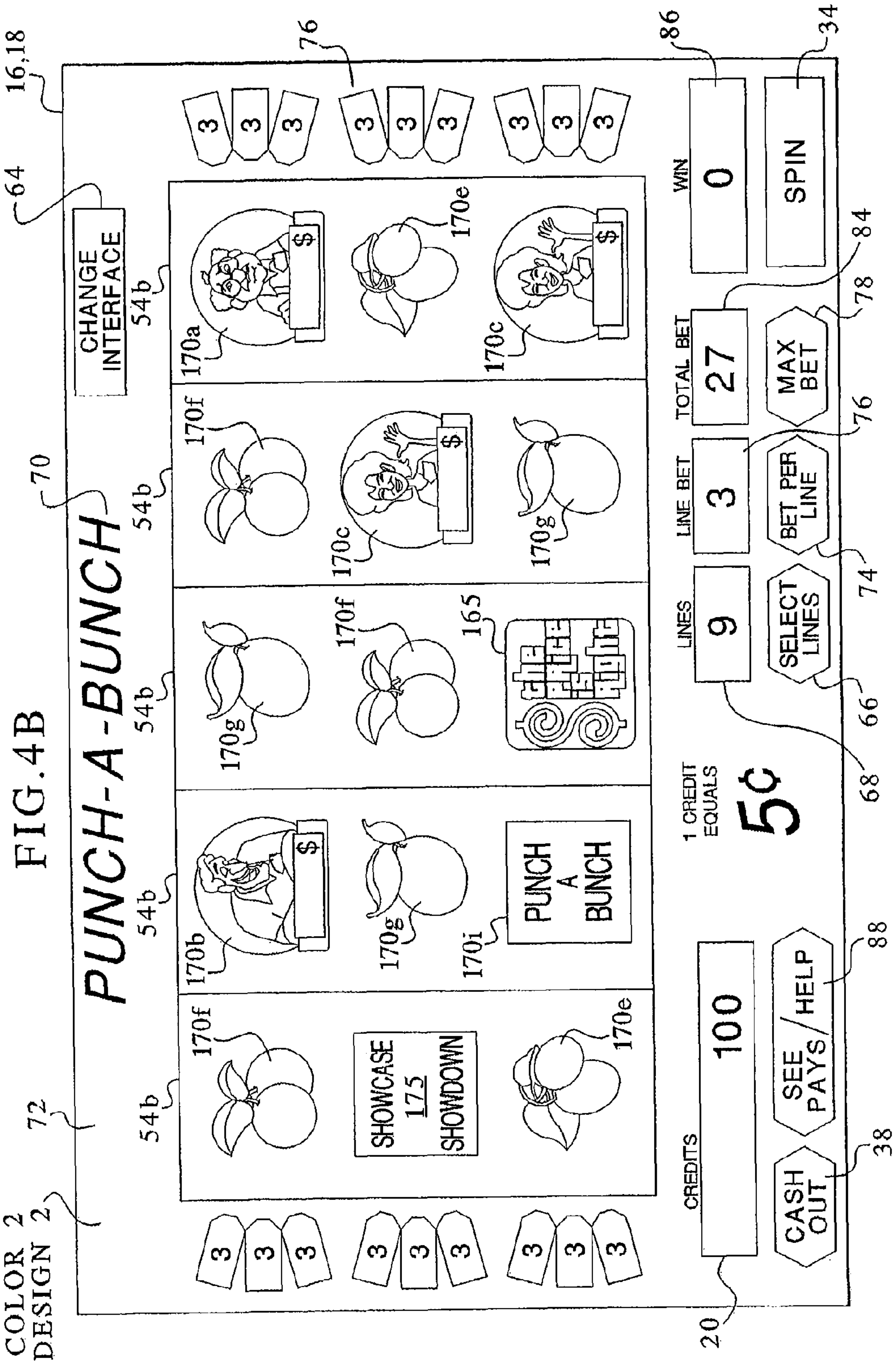
Figure 4C:
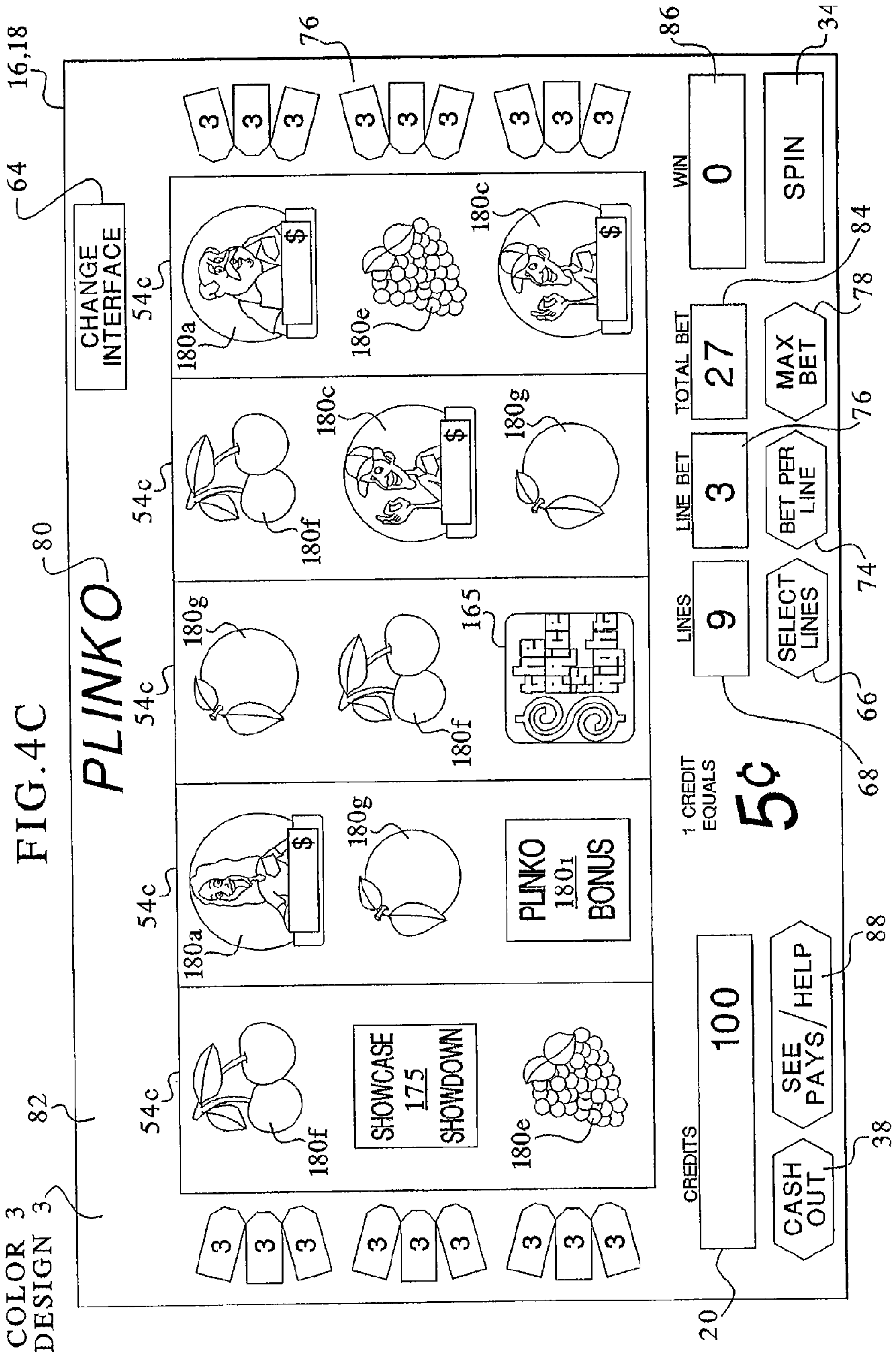

Referring now to FIGS. 4A to 4C, the symbols on the reel strips of FIG. 5 that are not shown in FIGS. 3A to 3C are illustrated to complete the sets of symbols shown in the see pays menu 90 of FIG. 5. FIGS. 4A to 4C illustrate an outcome from a different play of the game than the outcome shown in FIGS. 3A to 3C. The outcome of the game is the again the same in each of the FIGS. 4A to 4C. The difference is that the player sees different symbols and different designs and colors depending on which interface 60, 70 or 80 that the player chooses to use. The player wins or loses the same amount regardless of which interface the player chooses.

FIGS. 4A to 4C illustrate the symbol 160*b*, which is related to symbol 170*b* and 180*b*, which are each located in the top position on the second reel of the reels 54*a*, 54*b* and 54*c*, respectively. Likewise, related symbols 160*g*, 170*g* and 180*g* are located on the second position of the second reel of related reels 54*a*, 54*b* and 54*c*. The symbol 160*a* is related to symbol 170*a* and symbol 180*a*, which are each shown on the upper position of the fifth reel of reels 54*a*, 54*b* and 54*c*, respectively. Those symbols complete and show each of the symbols of the paytable and menu 90 shown in FIG. 5.

The related symbols are provided in the same amount on each of the reels 54. Moreover, the relative placement of the different symbols on the reels 54 is the same for each interface 60, 70 and 80. It does not therefore matter which interface the player plays in terms of the outcome of the game in the illustrated embodiment. The player plays the interface that provides the most fun and enjoyment to the player, at least at a certain period of time. The player may for example feel that one of the interfaces is luckier than the remaining interfaces. In reality, the odds are exactly the same regardless which interface the player plays. The player may also prefer the symbols of one of the interfaces 60, 70 or 80 versus another. Moreover, a color scheme of one interface may be more appealing to the player than another color scheme or design. This makes the gaming machine more entertaining and interesting for the player by allowing the player to select the interface and change interfaces as the player desires.

The present invention also expressly contemplates having a different sound track for the different interfaces 60, 70 and 80. In that manner, one of the sound tracks may be preferred by the player versus the other available sound tracks. The overall theme and feel of a particular interface (visual and audio) can also be appealing to the player with respect to other interfaces. Finally, the player may simply grow to enjoy, know and therefore prefer a particular interface versus another such interface. This also provides the player with more interaction with the gaming device.

The interfaces also add variety to the gaming experience. If the player does not win credits or money after a number of successive game plays, the present invention provides the player with an opportunity to change the interface. If the player experiences success after changing the interface, the process of changing interfaces can become a desirable remedy to the player who wishes to try to change his or her luck. The interface change therefore provides a method and apparatus for increasing the overall fun and enjoyment associated with gaming.

Referring now to FIG. 5, a paytable 90 is illustrated. Paytable 90 includes each of the symbols described above for each of the interfaces 60, 70 and 80. Paytable 90 also includes an input device 92, 94 and 96 for each interface 60, 70 and 80, respectively. As illustrated, symbols 165 and 175 are common to each of the interfaces 60, 70 and 80. Other symbols include related indicia. For example, symbols 160*a* to 160*d* each correspond to symbols 170*a* to 170*d* and symbols 180*a* to 180*d*. Each of those symbols includes indicia of a character or person. When the player changes interfaces, the character symbol of one interface is replaced by a character symbol of the next interface. If the interface is changed again to the third interface, a new character is substituted.

One embodiment of the present invention also includes other symbols which are related by functionality. For example, each of the symbols 160*i*, 170*i* and 180*i*, which have different indicia, each are involved with triggering a bonus game. Symbols 175, which on the other hand are common for each of the interfaces, trigger a common bonus game. The present invention therefore includes a bonus game triggered by a symbol belonging to each of the interfaces or by a symbol specific to each of the interfaces. In the illustrated embodiment, in which the average expected value of the game is the same regardless of which interface the player chooses, the bonus game for the symbols 160*i*, 170*i* and 180*i* is either the same bonus game regardless of which interface the player plays or is a bonus game specific to one of the interfaces, but which has the same average expected value as bonus games associated with the other interfaces. By structuring the bonus games and bonusing in such a manner, the player is not rewarded or punished for playing with any particular interface.

Symbol 165, which is common to each of the interfaces 60, 70 and 80 provides the same function, namely, acts as a wild symbol in each of the interfaces. Symbol 165 operates alternatively as a standard symbol, which alone or in combination yields one or more winning combinations.

Still other related symbols of interfaces 60, 70 and 80 have different or unrelated types of indicia. For example, symbol

160*g* is a flower, while symbols 170*g* and 180*g* are fruits, namely, a lemon and orange respectively. The game implementer can therefore provide consistency between certain symbols of the different interfaces but at the same time add variety to one or more other symbols of the interfaces.

Paytable 90 also displays a payout portion 100, which shows the pays 102 associated with the combinations 104. As is common with slot, the payouts each begin on the leftmost reel and proceed across the second to fifth reels. The combinations 104 for the wild symbol 165 show that four credits are provided for a single wild symbol 165 appearing on the leftmost reel, twenty-five credits are provided for two wild symbols appearing consecutively on the first two reels, two hundred credits are provided for three wild symbols 165 appearing consecutively on three reels, one thousand credits are provided for four wild symbols appearing consecutively on four reels and five thousand credits are provided for five wild symbols appearing on all five reels.

A message provided in conjunction with the pays 102 indicates that nine thousand credits are provided if five wild symbols 165 appear on the ninth payline. Each of the payouts for the remaining symbols proceeds in a similar manner to symbols 165 but yield different pays 102. For certain symbols, at least three of the symbols must appear consecutively. For other symbols, two symbols must appear consecutively. The important point for the present invention is that the pays are each the same in the illustrated embodiment and are common to each interface 60, 70 and 80. Further, each interface includes the same amount of different symbols, namely, eleven different symbols in the illustrated embodiment. More or less than eleven symbols can alternatively be used. Further, winning combinations can be provided that include more than one different symbol from the same interface, which combination would then correspond to combinations in the remaining interfaces.

Although not illustrated in paytable 90, it should be appreciated that as stated above, each of the symbols of the different reel strips is provided in the same amount and in the same order on each of the reels. The game in the illustrated embodiment is therefore the same game regardless of which interface 60, 70 and 80 the player plays. To that end, payout menu 90 displays the interface selectors 92, 94 and 96 that enable the player from menu 90 to choose a desired interface for play.

Figure 6:
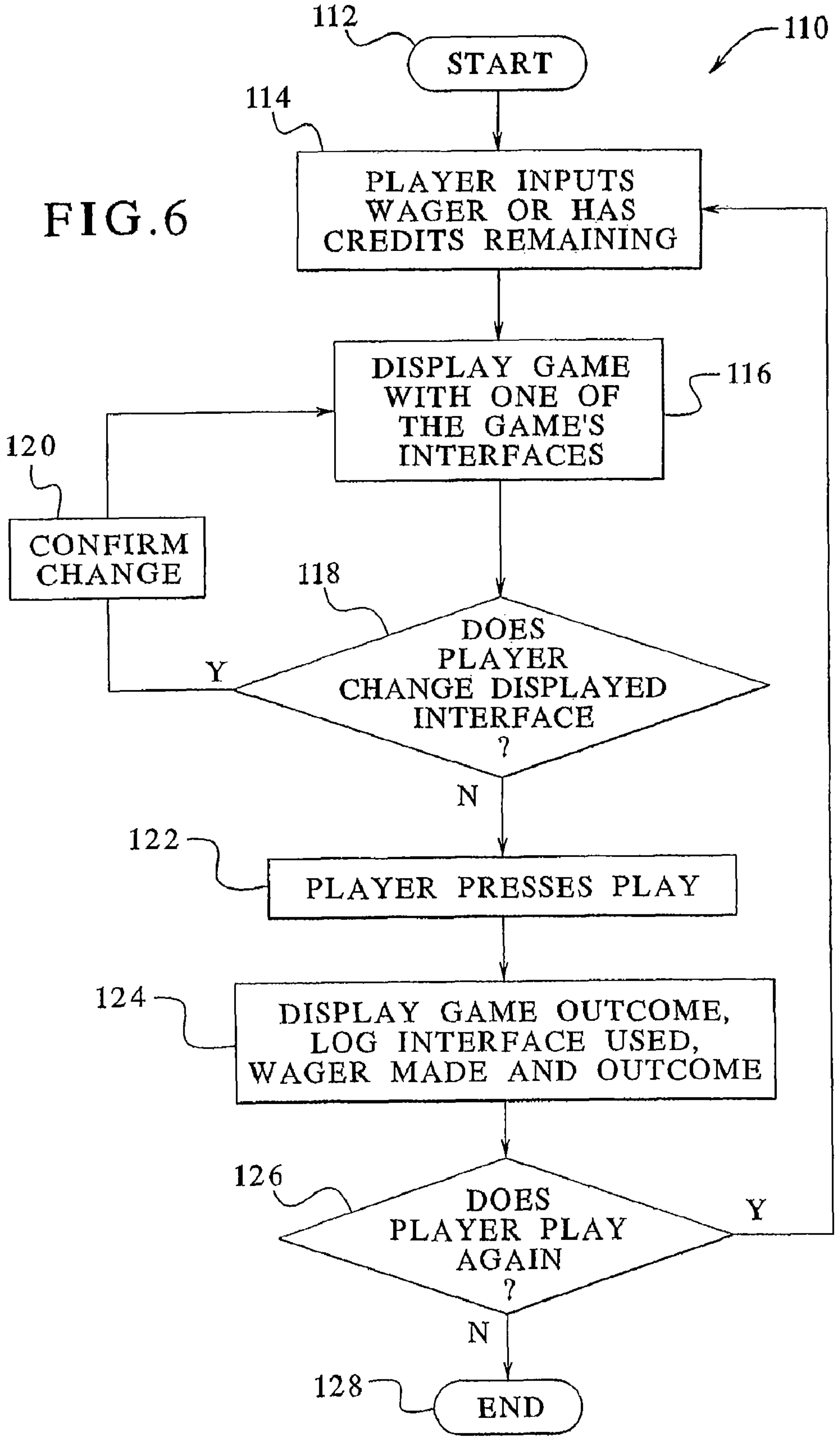
FIGS. 6, 7 and 8 are schematic flow diagrams illustrating three different methods of using the multiple display interfaces of the present invention.
Figure 7:
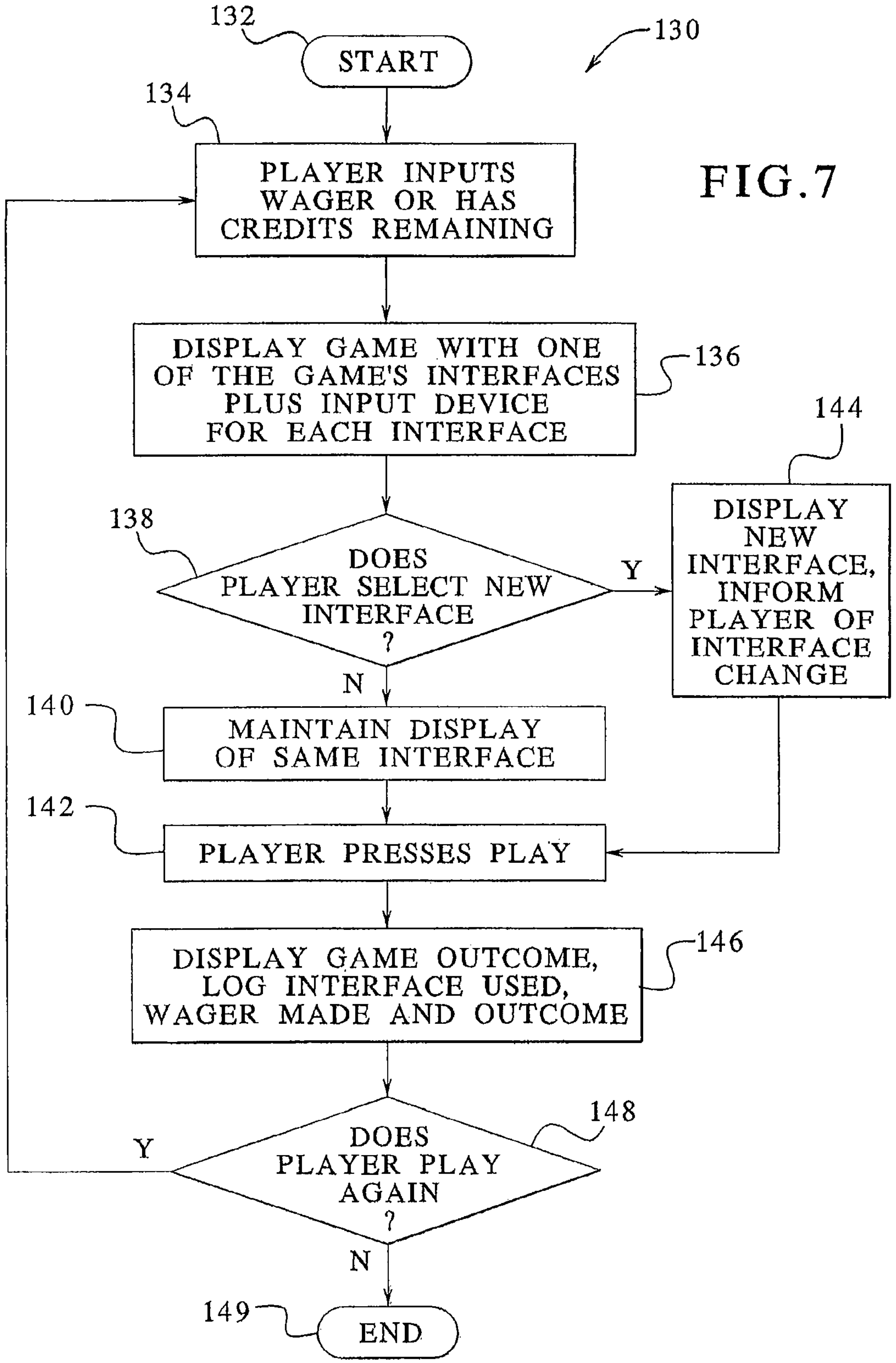
Figure 8:
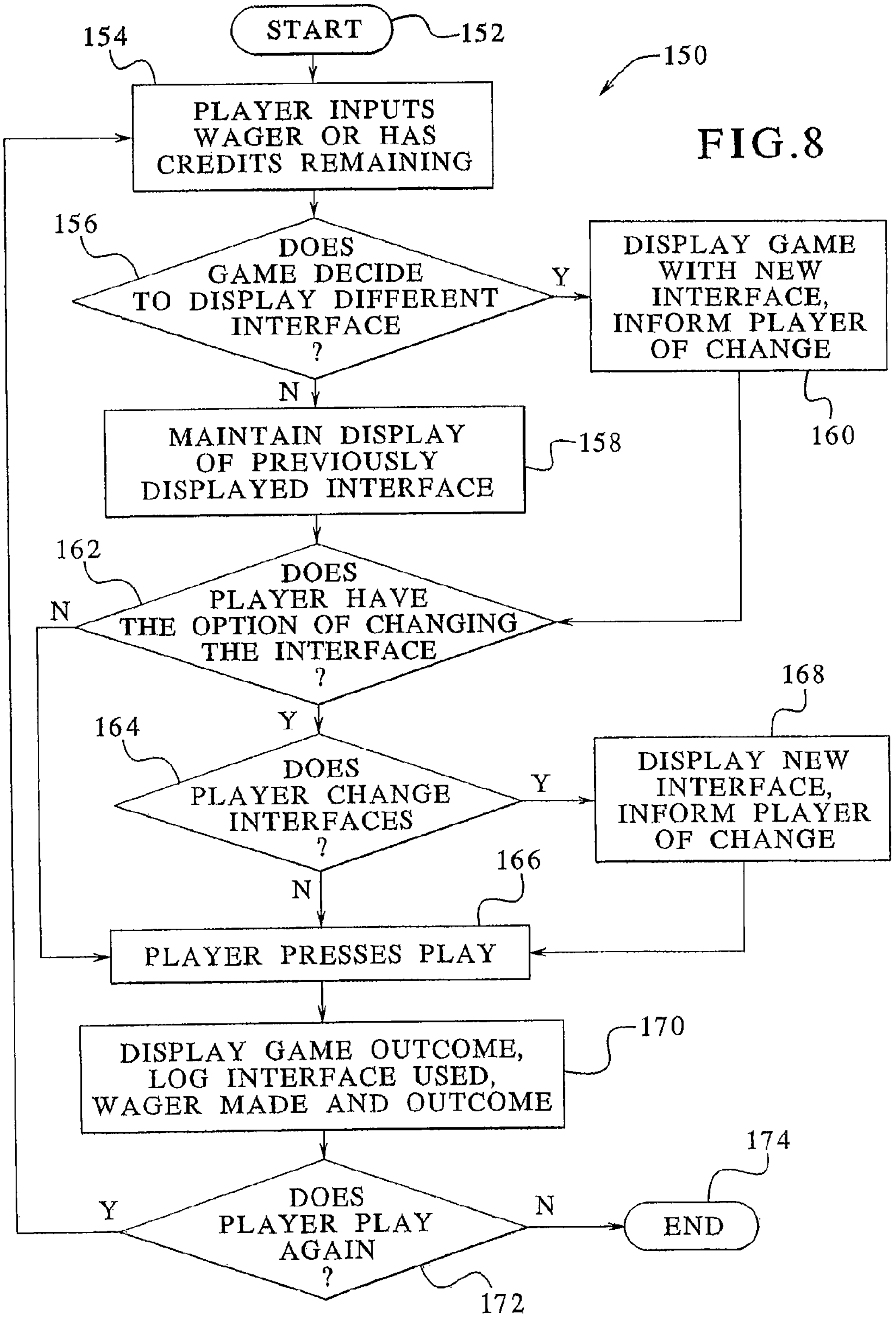

Referring now to FIGS. 6 to 8, various methods for playing a game using the changeable interfaces of the present invention are illustrated. FIG. 6 illustrates a method 110 in which the player toggles an input device, such as device 64 discussed above, until the player reaches the desired interface. Method 130 of FIG. 7 illustrates an alternative embodiment, wherein the player presses a button dedicated to the desired interface, such as input devices 92 to 96 described above, to operate the game using the desired interface. FIG. 8 illustrates a method 150 that alternatively allows for gaming device 10 to automatically change an interface. Method 150 also illustrates that the player in one embodiment can override the gaming device's decision to change interfaces.

In method 110, upon starting the method as indicated by oval 112, the player inputs an appropriate wagerable amount or already has enough credits inputted into the gaming device to place a wager, as indicated by block 114. Next, gaming device 10 displays the game having one of the game's interfaces, as indicated by block 116.

In method 110, gaming device 10 enables the player to input whether to change the displayed interface, as indicated by diamond 118. If the player does input to change the interface, the game confirms such change, as indicated by block 120 and displays the game with a new one of the game's interfaces as indicated by block 116. The loop created by block 116, diamond 118 and block 120 is repeated, i.e., the player toggles through the available interfaces until the player does not input to change an interface and instead presses the play or spin button, as indicated by block 122.

Upon the play or spin input, gaming device 10 displays the game and generates a game outcome. A game log located in memory device 40 stores, for example, which interface is used for that previous play, the wager made and the game outcome, as indicated by block 124. Next, gaming device 10 determines whether the player decides to play again, as indicated by diamond 126. If the player does not play again, the method 110 ends as indicated by block 128. If the player does play again the player inputs the appropriate wager or has credits remaining enough to play the game, as indicated by block 114. The loop created by block 114 and diamond 126 is repeated until the player determines not to play again.

Referring now to FIG. 7, a method 130 illustrates an alternative embodiment, wherein the player presses a button dedicated to the particular interface desired. Upon starting the method as indicated by oval 132, the player inputs an appropriate wager or has credits remaining enough to play the game, as indicated by block 134. Next, gaming device 10 displays the game with one of the game's interfaces and also displays an input device for each interface, as indicated by block 136. In one embodiment, gaming device 10 displays the see pays input 88 that enables the player to call up the payout menu 90 shown in FIG. 5. Payout menu 90 then displays the symbols of the different interfaces 60, 70 and 80. Menu 90 also displays the interface selectors 92, 94 and 96.

The player can in method 130 peruse or view each of the symbols displayed for each of the interfaces and then pick one of the interfaces by selecting one of the inputs 92 to 96. Alternatively or additionally to the see pays input 88, the inputs 92 to 96 are provided on the game screens, such as the screens in FIGS. 3A to 4C. Further alternatively, the interface buttons 92 to 96 are provided as electromechanical inputs located on the gaming device chassis. In any case, the player can choose to go to directly to the game having a desired game interface via the selection of an input dedicated to that interface.

Gaming device 10 then determines whether the player selects a new interface as determined in connection with diamond 138. If the player does not select a new interface, gaming device 10 maintains the display of the same or old interface, as indicated by block 140 when the player presses the spin or play button, as indicated by block 142. If the player does select or choose a new interface, gaming device 10 displays the game having the new interface and informs the player of such change, as indicated by block 144.

When the player presses play, as indicated by block 142, gaming device displays a game outcome and logs the interface used, the wager made and the outcome, as indicated by block 146. If the player does not play again, as indicated by diamond 148, the method ends, as indicated by oval 149. If the player does play again, as indicated by diamond 148, the player inputs an appropriate wager or has an appropriate amount of credits remaining on the gaming device, as indicated by block 134. The loop created between block 134 and diamond 148 is then repeated until the player decides not to play gaming device 10 again.

Referring now to FIG. 8, a method 150 is illustrated. Upon starting the method as indicated by oval 152, the player inputs an appropriate wager or has credits remaining on the gaming device already, as indicated by block 154. Next, or at some point prior to the player pressing the player's spin button, gaming device 10 determines whether to display a different game interface, as indicated by diamond 156. If gaming device 10 does not decide to change the game's interface, gaming device 10 maintains the display of the previously displayed interface, as indicated by block 158. If the game does decide to display a different interface, gaming device 10 displays the game having a new interface and informs the player of the change, as indicated by block 160.

Method 150 provides an option in which the player can override a change of interface made previously without player input, i.e., on the game's own initiative. That option in an alternative embodiment is not provided. The next step in the method 150 is therefore to determine whether that option has been provided, as determined in connection with diamond 162. If that option is not provided, the game proceeds to the point where the player presses the play or spin button, as indicated by block 166.

If the player override option is provided, the next step is to determine whether the player exercises the option, as indicated by diamond 164. If the player does not re-change the game interface, the game proceeds to allow the player to press the player spin button with the currently displayed interface, as indicated by block 166. If the player does change the game interface, gaming device 10 displays a new interface and informs the player of the interface change, as indicated by block 168.

Ultimately, a game having a selected game interface is ready to be played, as indicated by block 166. After the player presses the player spin button, gaming device 10 displays a game outcome and logs (for example) which interface has been used, the wager made and the outcome, as indicated by block 170.

Next, a determination is made whether the player plays the gaming device again, as indicated by diamond 172. If the player does not play the game again, method 150 ends, as indicated by oval 174. If the player does decide to play the game again, the player inputs an appropriate wagerable amount or has enough credits remaining to replay the game, as indicated by block 154. The loop created by and between block 154 and diamond 172 is repeated until the player no longer desires to play the game and the method ends as indicated by oval 174.

Method 150 presents a new feature contemplated the present invention, namely, that the interfaces can automatically change without a decision by the player to make the change. The present invention additionally contemplates various reasons or triggering mechanisms upon which the gaming device 10 decides to change the display interface. Some of those justifications are listed in FIG. 9. FIG. 9 is in no way intended to limit the scope of the invention to the justifications listed therein. FIG. 9 does however illustrate that there are many different reasons or justifications that gaming device 10 can use to decide to switch the game interfaces of the present invention.

In one embodiment, as indicated by entry 182, the switch is made randomly but is not made based upon a game event. For instance, gaming device 10 could simply store a weighted or non-weighted random generation device that operates completely independently of any function of the game, but which can determine randomly: (i) when to change interfaces, and (ii) to which interface to change. In one example, such random generation device is weighted so that the likelihood of changing interfaces increases at some linear or nonlinear rate over time. Again, entry 182 and any of the entries listed herein is in one embodiment combined with the override feature discussed in connection with method 150, which enables the player to override any random change of game interfaces by gaming device 10. The override allows the player, for example, to switch back to an interface in which the player has enjoyed success or is otherwise desirable.

Entry 184 sets forth that the interface switch is alternatively made randomly based upon a game event. That is, a random game event occurs that triggers the interface change. The random result can be any type of symbol or symbol combination appearing on an active or non-active payline. In another embodiment, the random game event is the incrementing of a meter, such as a persistence meter via the generation of a symbol or symbol combination on the reels 54. In still another embodiment, the random game event is a result of a progressive game played in conjunction with the base game of slot that is triggered via the spinning of reels 54. The random event can also be a return from a bonus event or as a result of an event in a bonus game such as the picking of a selection in a bonus game.

Entry 186 shows that gaming device 10 can switch interfaces based on the player's wager. The wager dependency can include the player's overall wager or a component thereof. For example, the interface displayed can depend upon the number of paylines wagered or the player's wager per payline. Alternatively, the player's total wager determines which of a plurality of interfaces is played. The dependency can be figured on a game by game basis or accumulated over a plurality of game plays.

As indicated by entry 188, gaming device 10 switches interfaces alternatively based on an amount of credits accumulated or lost by the player. For example, if the player loses a certain percentage or amount of an initial amount of credits, gaming device 10 can automatically switch interfaces to try to change the player's luck. Alternatively, if the player wins a certain amount, gaming device 10 can change interfaces to display a game interface, which is rarely displayed or seen by players. Such an interface provides an incentive to the player to continue gaming and attempt to win a certain amount and enjoy an interface that is normally not achieved by most players. The credits accumulated and lost can be accounted for over a single game, multiple games or many games. The credits can be analyzed on a percent basis or on an actual credit basis.

Entry 190 indicates that gaming device 10 alternatively automatically switches interfaces based on a number of times that the player has played a game consecutively. For instance, gaming device 10 can display a first interface for the first fifty game plays, a second interface for the next fifty game plays and a third interface for the third fifty game plays, etc. Such switching occurs regardless of the player's wager and the player's level of success during previous game play.

Entry 192 indicates that a switch can be made automatically based on a tabulation maintained by a player tracking card. Many casinos offer player tracking cards that keep track of a number of games played and an amount wagered within a particular casino. The casinos then award the player for playing a certain number of games or wagering a certain amount. The present invention expressly contemplates using the tabulations kept by a player tracking card in combination with the interfaces of the present invention. For example, the player tracking card could have bronze, silver and gold levels based on different levels and amounts of game play. Gaming device 10 in turn displays an interface or interfaces specific to the bronze level, silver level or gold level, depending on the player's current level of play. Entry 192 enables the player to accumulate plays over time and over multiple plays of multiple different gaming devices and obtain a benefit for such accumulation.

Entry 194 changes the game play based on a game theme or a story line of thereof. For example, if the game theme involves a movie, gaming device 10 in one embodiment displays an interface based on a particular point or scene in the movie. The player for instance begins play of gaming device 10 with an interface having symbols and characters from or relating to an initial sequence or stage in the movie. After a certain number of plays, the interface switches automatically to show symbols from or relating to an early but intermediate point in the movie. As the player plays even more games, the game interface changes again to have symbols and characters from a middle portion of the movie. Still further plays of the game cause the gaming device to switch to symbols to correspond to an intermediate but latter portion of the movie. Still further plays of the game cause the game interface to change to display symbols and characters that occur in or relate to an end portion of the movie.

The gaming device 10 can have more or less than five different interfaces used in the example above that correspond to five different points or stages in the movie or theme. As alluded to above, each stage or sub-theme can have more than one interface associated with same, wherein gaming device 10 generates randomly which interface per stage to display and use. Again, gaming device 10 in an embodiment enables the player to override the automatic switch of an interface and to allow the player to select and display an interface from a desired point in the story line of the theme.

The theme based switch is not limited to movie themes but instead can be any of the different types of themes described above. For example, if a gaming device has a theme related to a famous band or singer, the interfaces can change to correspond to a particular song performed by the band or singer. If the theme involves a particular historical event, the interfaces can change to display different known entities or qualities associated with that event. If the theme of the game alternatively corresponds to a particular type of sport, the different interfaces can correspond to different teams that play the featured sport. Thus, the interfaces can be divided chronologically, by subject matter, or by any other suitable defining feature that separates the theme into known and discernable components or sub-themes.

Referring now to FIG. 10, a number of possible variables that change with a change of interface are illustrated. In the embodiments described above, the interfaces have been independent of the game played. That is, the game is the same regardless of which interface is used, both in terms of an expected value of the game and a volatility of the game. As shown above, especially in connection with FIG. 5, the payout combinations are the same for each of the interfaces. The only change in connection with the interfaces is the display of new or different symbols. The present invention, however, expressly contemplates changing a game feature along with the change of an interface. Again, the table of FIG. 10 is not meant to limit the invention to the listed items but to illustrate instead that the interfaces be accompanied by many different types of game variables.

Entry 202 shows that in one embodiment the volatility of the paytable changes when the interface changes. That entry expressly contemplates the expected value of the paytables of the interfaces remaining constant or substantially constant. The changing volatility pertains to whether the gaming device provides smaller awards more often or larger awards more infrequently. Thus the player could start out by playing gaming device 10 with a first interface that provides awards of a smaller or moderate size but does so on a relatively frequent basis. As the player plays more and more games, the interface changes one or more times to interfaces and associated with higher payouts that are provided less frequently. The reverse could also be true, i.e., move from more volatile to less volatile. In an alternative embodiment, this can be based on an amount of credits on the credit meter. For instance more volatility for higher credits and less volatility for lower credits.

Entry 204 illustrates that the expected value can change by way of a change in payout percentage or a change in payouts in connection with a change of interfaces. Thus, repeated play could enable the player to play potentially better-paying games. Alternatively, higher payout percentage or expected value games can be provided along with a new interface after the player has lost a certain number of games or a certain amount of credits or coins. To that end, each of the entries 202 to 212 can be combined with any of the entries 182 to 194, so that any of the game variables of FIG. 10 can be combined with any of the automatic interface change triggers of FIG. 9.

It is not likely that gaming device 10 would allow a player to selectively change a game that is advertised to have a higher payout percentage or average expected value. It is, however, contemplated that such may be the case when that fact is not advertised, in which case the player may never be able to learn that, in fact, one game has a higher average expected value than another. The difference in average expected value is also expressly contemplated to be due to the different in average expected values in bonus games available in one interface versus a bonus game available in another interface, or a bonus game available in one interface, wherein a lesser number or no bonus game is provided in another interface.

Entry 206 shows that a wager requirement or eligibility requirement for a game event can change upon a change of interfaces. For example, the wager requirement to activate or make the player eligible for a bonus game can change upon a change of interfaces. Likewise, the wager requirement to make the player eligible for winning a progressive payout can vary based on the game interface used. Moreover, the wager requirement to make the player eligible to increment an award meter, such as a persistence meter, can vary based on which interface the player plays. The entries 206 correspond somewhat to the entries of 204, which involve the payback percentage or expected value. Entries 206, on the other hand, effect the player's ability to be eligible to achieve a particular gaming device advantage, as opposed to a likelihood or percentage that the player will achieve such advantage.

Entry 208 illustrates that the symbol or symbols used to trigger a bonus game, progressive win, persistence meter increment, or any of the other game advantages listed in connection with entry 206, can change based on which interface is played. Thus, entry 204 deals emphasizes variability with respect to a payout for a particular type of gaming event. Entry 206 involves eligibility and entry 208 deals with the likelihood of achieving a gaming device advantage. It should also be appreciated that for each different interface, the bonus game(s) triggered can be different.

Entry 210 illustrates that the total number of different symbols between different game interfaces can change. For example, one interface can include ten different symbols, while another includes twelve, fifteen or other suitable amount of different symbols. The different numbers of different symbols can also yield different numbers and types of winning combinations.

Entry 212 indicates that different interfaces in one embodiment include a different proportion of a particular symbol or a different ordering of that symbol on the reel strips. For example, a particular symbol can be provided in a percentage of ten percent on a reel strip in a first interface, while that same symbol or a corresponding symbol is provided in a percentage of fifteen percent on that same reel in a different interface. The same symbol or corresponding symbols in different interfaces can likewise be ordered differently or provided on reels upon which like symbols or corresponding symbols are not provided in certain interfaces. That latter difference can result in a win of perhaps up to three symbols in a row in one interface and up to four or five symbols in a row on another interface, wherein the symbols are the same or are corresponding between the two interfaces.

As discussed in connection with the methods 110, 130 and 150 of FIGS. 7, 8 and 9, respectively, gaming device 10 employing the multiple interfaces 60, 70 and 80 also keeps a log of games that the player can review if the player has a question about a prior game result. In one implementation, the gaming device stores the previous ten game plays. The gaming device stores information such as, the player's wager, the wager components, the outcome on each payline and the total outcome, e.g., player wins nothing, player wins less than wager, player wins wager amount or player wins more than wager amount. In one embodiment, the log also records the particular interface used in each game. The player can therefore review which interface was used, e.g., ten games ago, seven games ago, five games ago, etc.

Figure 11:
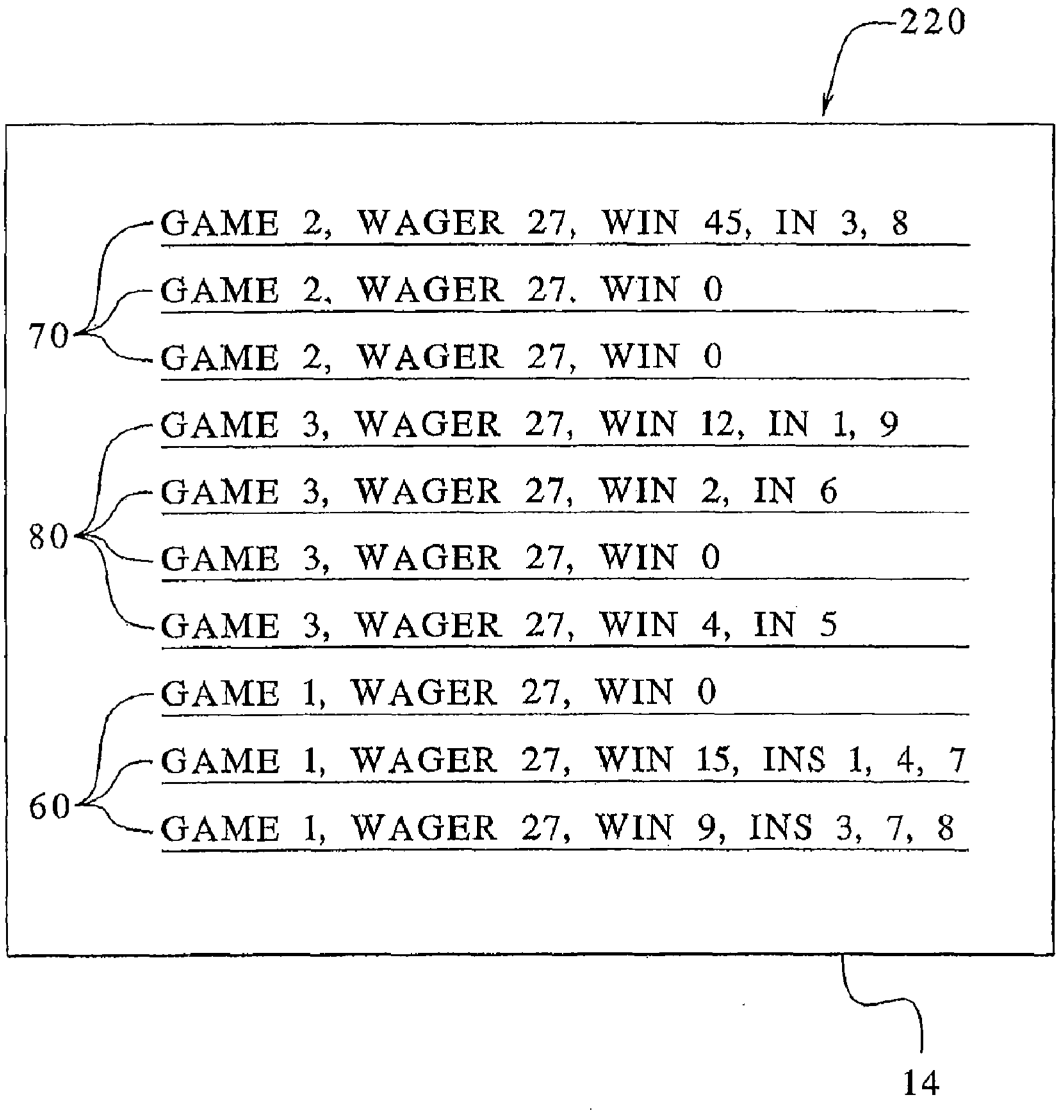
FIG. 11 is an illustration of an area of memory that stores a game log showing information concerning the last ten plays of the gaming device of the present invention including plays using different game interfaces.

Referring now to FIG. 11, one example of a game log 220 is illustrated. Game log 220 illustrates that the most recent three games have been played using Game 2 or interface 70. The previous four games were played using Game 3 or interface 80. The oldest three games kept in log 220 were played using Game 1 or interface 60. As illustrated, game log 220 is stored in memory device 14.

Memory log 220 is selectively called forth and displayed on display device 16 or 18 via a player input, such as the see pays input 88. Game log 220 shows other information such as the player's wager. As shown, in each of the ten games, the player has wagered twenty-seven total credits or three credits each on all nine paylines. Log 220 illustrates that the player has most recently won forty-five credits, but that the player won no credits or did not break even in the previous nine plays of the game. Game log 220 also shows the lines upon which the player has won. In the most previous game, for example, the player won on lines three and eight in amounts totaling to the win of forty-five credits. Five games ago, the player won two credits on a single payline, namely payline six. In the oldest entry kept, the player won nine credits on three paylines: three, seven and eight.

As stated above, log 220 can store other information, such as the amount of credits won on each payline or even the particular winning symbol or symbol combinations appearing on the paylines. Importantly, game log 220 shows the player which interface 60, 70 or 80 that the player has used over the amount of games stored. It should be appreciated that game log 220 can include any suitable number of entries, such as, fifty or one hundred entries.

As discussed above, it should be appreciated that if the processor or an event causes a change of the interface, in one embodiment, the gaming machine includes a player override input which enables the player to override the auto-selection of the interface.

It should also be appreciated that the present invention provides, in one embodiment, a menu which enables the player to see a plurality or all of the possible interfaces which the player or processor can select. In this embodiment, the player can select one of the interfaces for display such as through a touch screen.

It should also be appreciated that the present invention enables the player and/or game operable to access and determine one or more of the previous interfaces displayed by the player. Thus, the player or game operable can determine the interfaces selected by the machine or the player.

A further embodiment of the present invention determines which of a plurality of different interfaces to use or employ in a game based on a player's wager or component thereof from a plurality of different potential or possible wagers or a plurality of different wager components such as the number of paylines. In another embodiment, the gaming device includes a plurality of different paytables and a plurality of different interfaces. The gaming device determines which interface and which paytable to employ in the game based on the player's wager amount or wager component such as the number of paylines selected or wagered on by a player. Thus, in one embodiment, the gaming device enables the player to determine the interface and the paytable for the game based on how the player wagers.

FIGS. 12, 13, 14 and 15 illustrate one embodiment, where the gaming device determines or selects the interface and the paytable based on the number of paylines wagered on by the player. In this embodiment, the gaming device enables a player to wager on a number of paylines and wager an amount per payline. The number of paylines wagered on determines whether Interface A 222, Interface B 236 or Interface C 250 is presented to the player. The gaming device also determines to employ Paytable A 264, Paytable B 236 or Paytable C 250 based number of paylines wagered on by the player.

Figure 12:
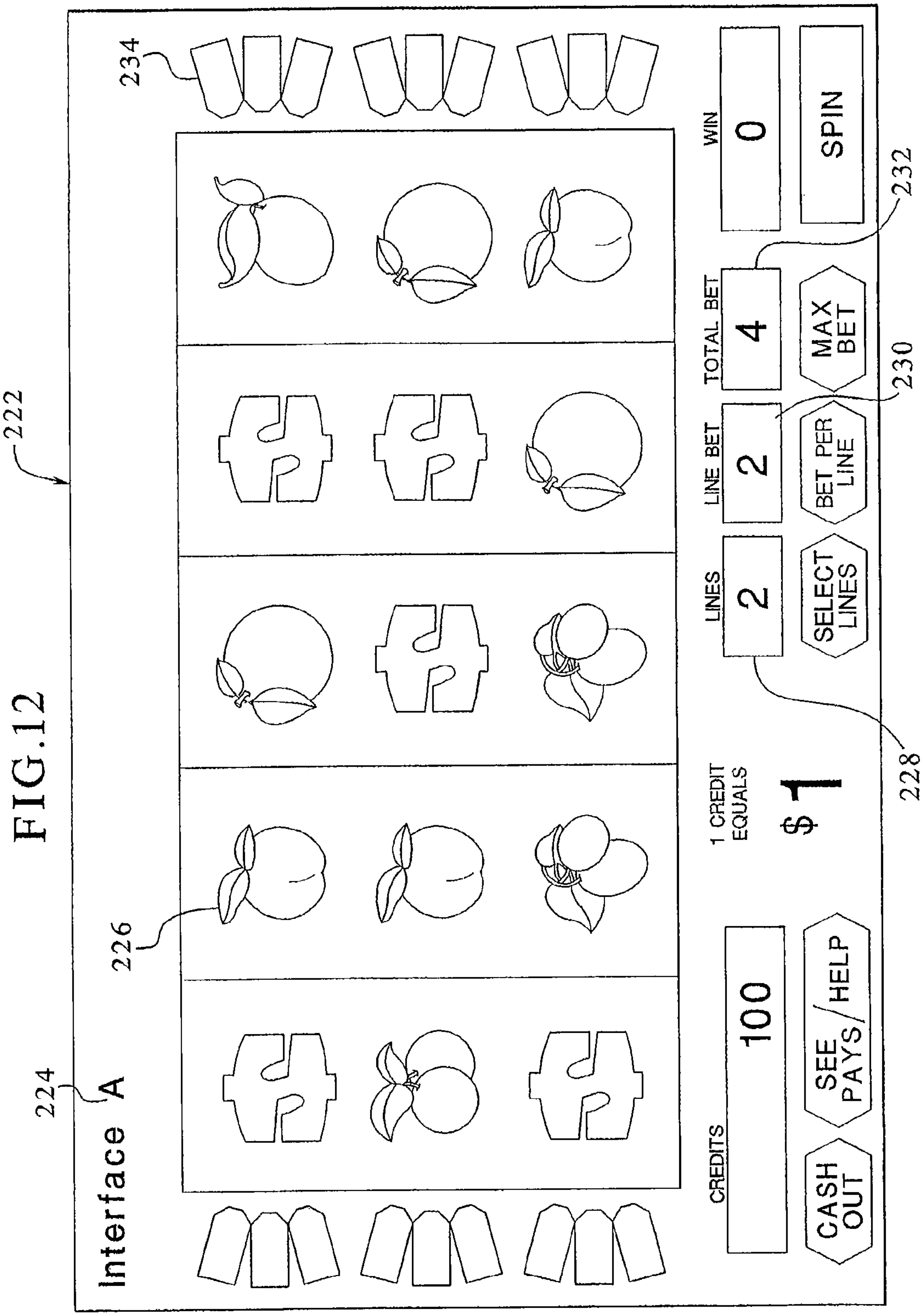
FIGS. 12, 13, and 14 are elevation views of a display device showing three different display interfaces of the present invention, wherein each interface corresponds to a different wager amount.
Figure 13:
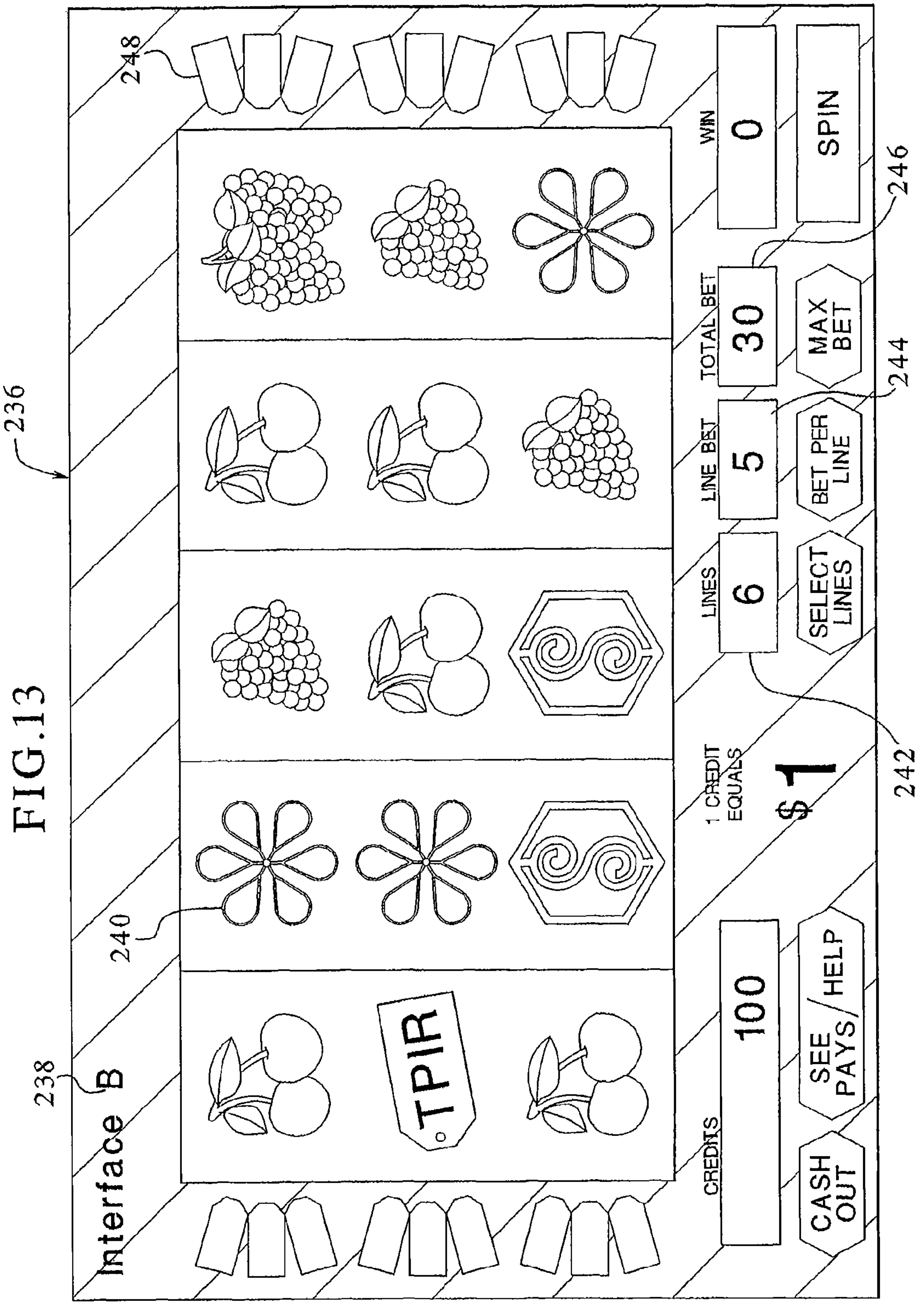
Figure 14:
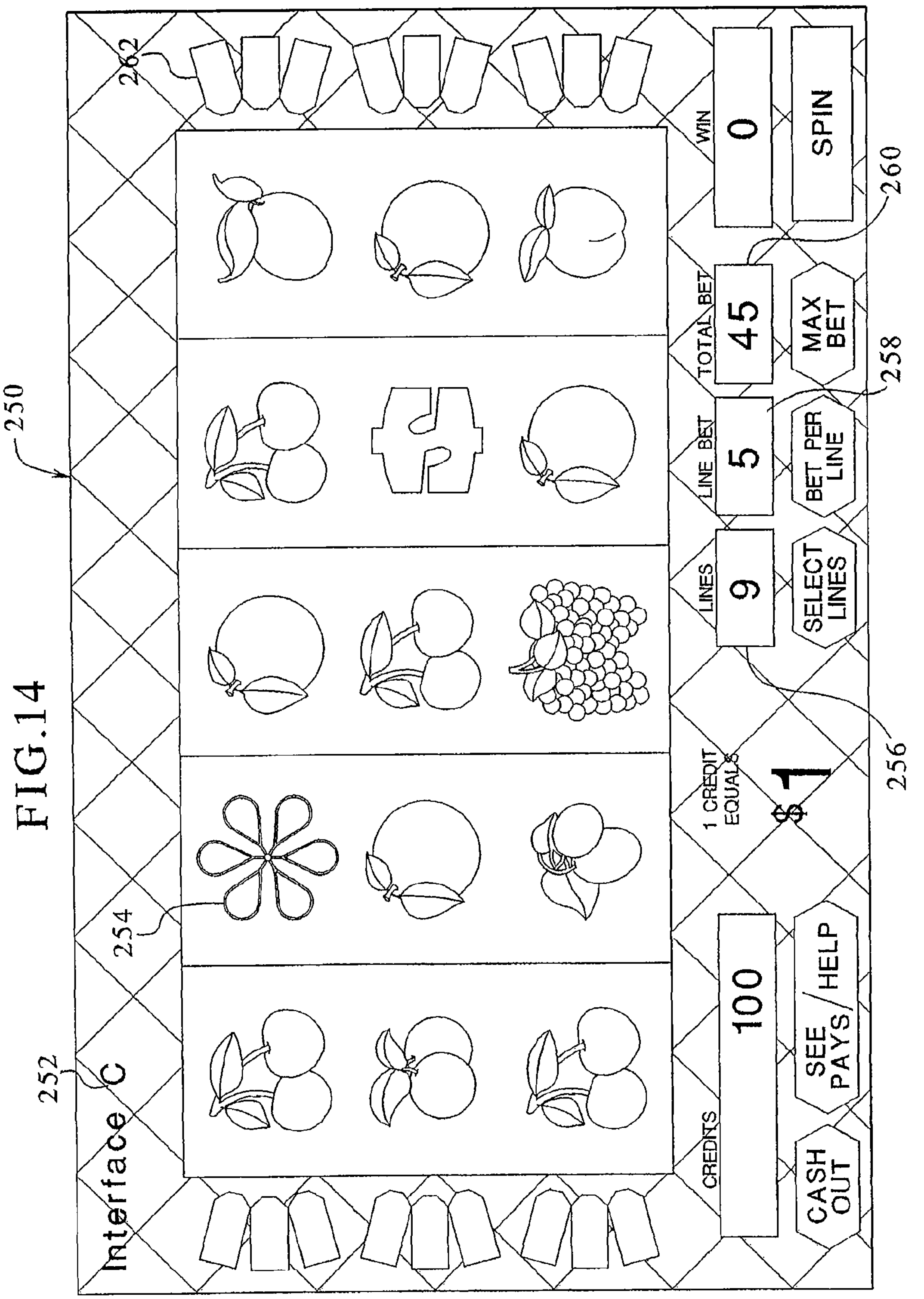

FIGS. 12, 13 and 14 illustrate three different interfaces: Interface A 222, Interface B 236, and Interface C 250. In this embodiment, each of the interfaces is a different color and includes different symbols. It should be appreciated that each of the interfaces may include one different symbol, a plurality of different symbols or completely different symbols. Each of the interfaces is associated with a different range of or a designated number of paylines. The gaming device employs the interface associated with the number of paylines wagered on by the player 228, 242, and 256. In this embodiment, when a player wagers on one to three paylines, the gaming device employs Interface A. When a player wagers on four to six paylines, the gaming device employs Interface B. When a player wagers on seven to nine paylines the gaming device employs Interface C. Though there are nine paylines in the illustrated embodiment, it should be appreciated that the gaming device may include any suitable number of paylines. It should also be appreciated that increasing the paylines wagered on does not necessarily increase the overall wager. That is, a player may wager on a greater number of paylines but wager a small amount on each payline or a player may wager a large amount only on one payline.

Figure 15A:
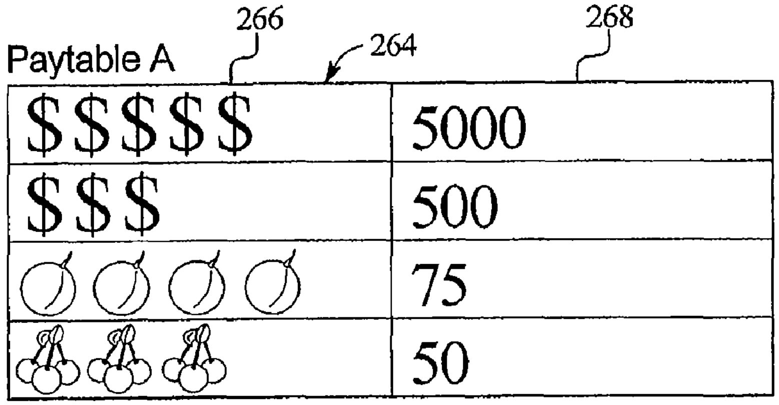
FIGS. 15A, 15B, and 15C are elevation views of a display device showing paytables linking related symbols of different interfaces and an interface selection input triggered by the player's wager amount.
Figure 15B:
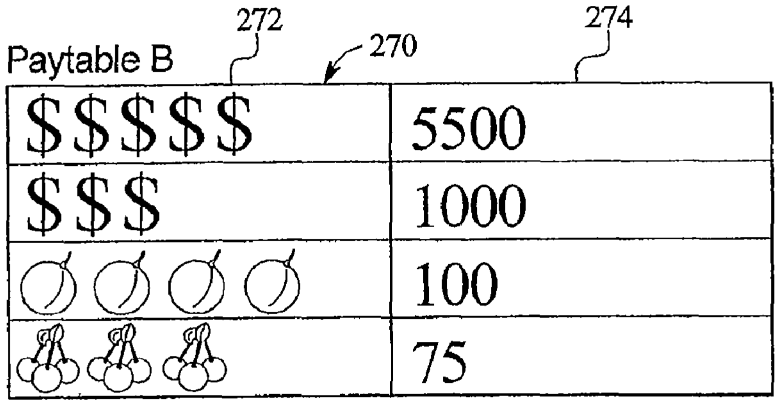
Figure 15C:
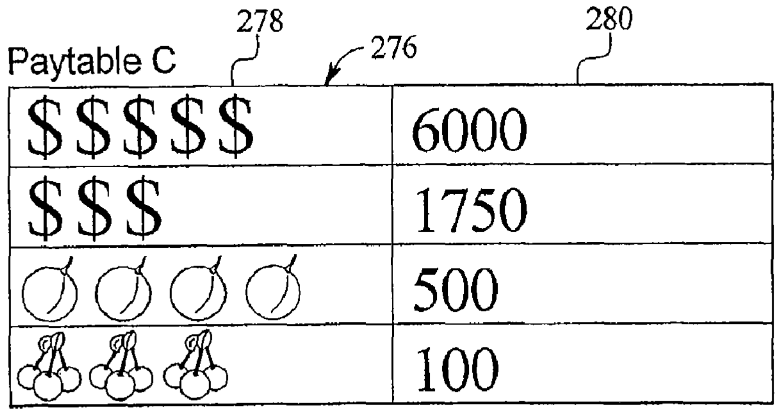

FIGS. 15A, 15B, and 15C illustrate three different paytables associated with the game. Each of the paytables is associated with a different range or a different designated number of paylines. The gaming device determines which paytable to employ in the game based on the number of paylines wagered on by the player. In this embodiment, when a player wagers on one to three paylines, the gaming device employs Paytable A. When a player wagers on four to six paylines, the gaming device employs Paytable B. When a player wagers on seven to nine paylines the gaming device employs Paytable C. Though there are nine paylines in the illustrated embodiment, it should be appreciated that the gaming device may include any suitable number of paylines.

FIG. 12 illustrates Interface A 222, a player selection of two paylines 228 and bet of two credits per payline 230 for a total wager amount 232 of four credits. In this embodiment, when the player wagers between one and three paylines, the gaming device employs Interface A and Paytable A. In this example, the player wagers on two paylines. The gaming device displays Interface A 222 in one color represented by the white space 224 and the gaming device employs Paytable A 264 (see FIG. 15A). Paytable A 264 has payouts 268 corresponding to the winning symbol combinations 266. In FIG. 12, the player's total wager amount 232 is four credits, and the gaming device employs Paytable A 264 to determine a game result or outcome.

Referring now to FIG. 13, a player wagers on six paylines 242. When a player wagers on six paylines, the gaming device employs Interface B and Paytable B. That is, Interface B and Paytable B are associated with four, five or six paylines. When a player wagers on six paylines, the gaming device displays Interface B and determines a game result or outcome based on Paytable B. Interface B 236 is a different color than Interface A or Interface C. For illustrative purposes, the color is represented by the single crosshatching 238. In this embodiment, a plurality of the symbols 240 are also different than the symbols of Interface A. The gaming device employs Paytable B 270 as shown in FIG. 15B. The Paytable B 270 has different payouts 274 than Paytable A 264 and Paytable C 276. In FIG. 13, the wager amount is five credits per payline on six paylines and the player's total wager is thirty credits. The gaming device determines the game result based on Paytable B 270.

FIG. 14 illustrates Interface C 250 which the gaming device presents to the player when the player wagers on seven, eight or nine of the paylines. Interface C 250 is a different color than Interface A or Interface B and this color is represented for illustrative purposes by the double crosshatching 252. The gaming device employs the Paytable C 276, shown in FIG. 15C. The Paytable C 276 has different payouts 320 than Paytable A 264 and Paytable B 270. In FIG. 14, the wager amount is five credits per payline on nine paylines. The player's total wager is forty-five credits, so the gaming device determines a game result based on Paytable C 276.

FIGS. 15A, 15B, and 15C illustrate Paytable A 264, Paytable B 270, and Paytable C 276, respectively. Each of the paytables includes the same symbols combinations. That is, though each of the interfaces include different symbols, in this embodiment, the winning combinations for all of the interfaces are the same. It should be appreciated that each of the paytables may include any suitable winning combinations. It should also be appreciated that the winning combinations for each paytable may be different.

More specifically, each of the paytables includes the same winning symbol combinations. Paytable A 264, Paytable B 270 and Paytable C 278 each includes the winning combinations 266, 272 and 278 respectively of five dollar signs, three dollar signs, four plums and three cherries. However, each of the paytables includes different payouts for the different symbol combinations. For example, Paytable A includes a payout 268 of 5000 credits for the combination of five dollar signs, while Paytable B includes a payout 274 of 5500 credits for the combination of five dollar signs. Paytable C includes a payout 280 of 6000 credits for the combination of five dollar signs.

In this embodiment, the payouts correspond to the number of paylines wagered on by the player. When the player wagers on a greater number of paylines, the gaming device employs a paytable which provides higher payouts for the same combinations. For example, the gaming device employs Paytable A when the player wagers on one, two or three paylines. Paytable A provides a payout of fifty credits for a combination of three cherries. The gaming device employs Paytable B when the player wagers on four, five or six paylines. Paytable B provides a payout of seventy-five credits for a combination of three cherries. The gaming device employs Paytable C when the player wagers on seven, eight or nine of the paylines. Paytable C provides a payout of one-hundred credits for a combination of three cherries. In this embodiment, the player can determine the level of payouts for the winning combinations by the number of paylines wagered on. The paytable employed determines the awards, values or outcomes which are associated with the selections. The gaming device provides the player an award or outcome based, at least in part, on the values associated with the picked selections.

In one embodiment, each of the interfaces is associated with a symbol set. In one embodiment, a paytable is associated with each of the symbol sets or each of the interfaces. Thus, when the gaming device determines interface, the gaming device determines the paytable. In one embodiment, at least one of the symbol sets or interfaces is associated with a paytable including a jackpot award. Therefore, a player's wager amount or a component thereof, determines the symbol set or interface and likewise the paytable and the possibility for a jackpot award. In one example of this embodiment, the symbol sets, the interfaces or the paytable associated with the jackpot award are associated with a designated number of paylines, such as a maximum number of paylines wagered on. In another embodiment, the symbol sets, the interfaces or the paytable associated with the jackpot award are associated with a designated amount, such as a maximum amount wagered per selected payline. When a player wagers a larger amount or has a greater designated wager component, the player has the possibility of achieving a jackpot award or a higher award.

It should be appreciated that the interfaces may be different in any suitable manner. In one embodiment, the interfaces include different hands of cards. In another embodiment, the interfaces include different numbers of symbols. Each of the interfaces may have one or more different symbols. In one embodiment, each of the symbols in each of the interfaces corresponds to another symbol in each of the interfaces. These symbols perform an identical function to a corresponding symbol of another interface. It should be appreciated that suitable number or type of symbols may be associated with each interface.

In one embodiment, the gaming device associates the same or substantially the same average payback percentage with each paytable. In another embodiment, the gaming device associates a different payback percentage with each paytable. In one embodiment, the paytables with a higher payback percentage are associated with a designated number of paylines, such as a maximum number of paylines wagered on. That is, the greater the number of paylines wagered on, the higher the payback percentage of the game. In another embodiment, the paytables with a higher payback percentage are associated with a designated wager amount per payline, such as a maximum amount wagered on each selected payline. That is, the greater the amount wagered per payline, the higher the payback percentage of the game. In one embodiment, each of the winning combinations or symbol combinations is associated with a probability of being generated. The probabilities associated with the winning symbol combinations may be the same or different for each interface. In one embodiment, the paytables have the same winning combinations. In another embodiment, the paytables have different winning combinations. The paytables may have the same numbers of winning combinations or different numbers of winning combinations. In one embodiment, the symbols in each of the interfaces are associated with the same probabilities of being generated but associated with a different paytable and thus different awards. In another embodiment, the symbols of the different interfaces have different probabilities of being generated but are associated with the same or substantially the same awards of the paytables. In one embodiment, the paytables have the same volatility.

In another embodiment, the paytables have different volatilities. In one embodiment, one of the paytables includes a jackpot award. In one embodiment, the ranges or designated wager amounts or components associated with the paytables are the same as the ranges or designated wager amounts or components associated with the interfaces. That is, the paytables are also associated with the interfaces. In another embodiment, the gaming device determines which paytable to employ using different designated wager amounts or components than the determination used for the interfaces.

In one embodiment, the present invention is a gaming system which includes a central server or controller that maintains one or more predetermined pools or sets of predetermined game outcomes. In one embodiment, the central server independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. In one embodiment, the gaming system includes different prize pools. In one example of this embodiment, each of the prize pools includes a certain number of win outcomes and lose outcomes. In one embodiment, the wager or a component thereof determines the pool from which the outcome is picked. That is, the central server or controller receives the wager component information and determines which pool to select the award from. For example, when a player wagers a greater amount per payline, the central server selects the game outcome from a pool with more win outcomes and a higher expected average value.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player.

In one embodiment, the wager amount or the wager component used to determine the interface and the paytable is configured on a game by game basis. In another embodiment, the wager amounts can be accumulated over a plurality of game plays. The gaming device tracks the accumulated wager amounts and when designated thresholds are met, the interface changes and the gaming device employs a different paytable.

In one embodiment, the interfaces includes a plurality of different symbols and the symbols in each interface perform an identical function in the game with respect to corresponding symbols on other interfaces. In one embodiment, the paytables includes different awards based on symbols with identical functions. That is, each of the paytables includes a different award amount for corresponding symbol combinations.

In one embodiment, the gaming device selects the interface and the paytable based on the number of paylines wagered on by the player. In another embodiment, the gaming device selects or determines the interface and the paytable based on the amount wagered per payline. In one example of this embodiment, when the player wagers more per payline, the gaming device selects a paytable with higher awards or with a greater number of winning combinations. In one embodiment, the gaming device selects the interface and the paytable based on the total amount of the wager. In another embodiment, the interface and paytable change when the player's wager amount reaches a designated level. For example, if the player's wager is in a first range, then the gaming machine presents the first interface and employs the first paytable. If the player's wager is in a second different range, then the gaming machine presents the second interface and employs the second paytable. If the player's wager is in a third different range, then the gaming machine presents the third interface and employs the third paytable. In one embodiment, the interfaces display the same color. In another embodiment, the interfaces are different colors. In one embodiment, each interface has different symbols: In another embodiment, each interface has at least one different symbol. In another embodiment, the interfaces each have the same symbols. It should be appreciated that the gaming device may include any suitable number of interfaces and any suitable number of paytables.

Figure 16:
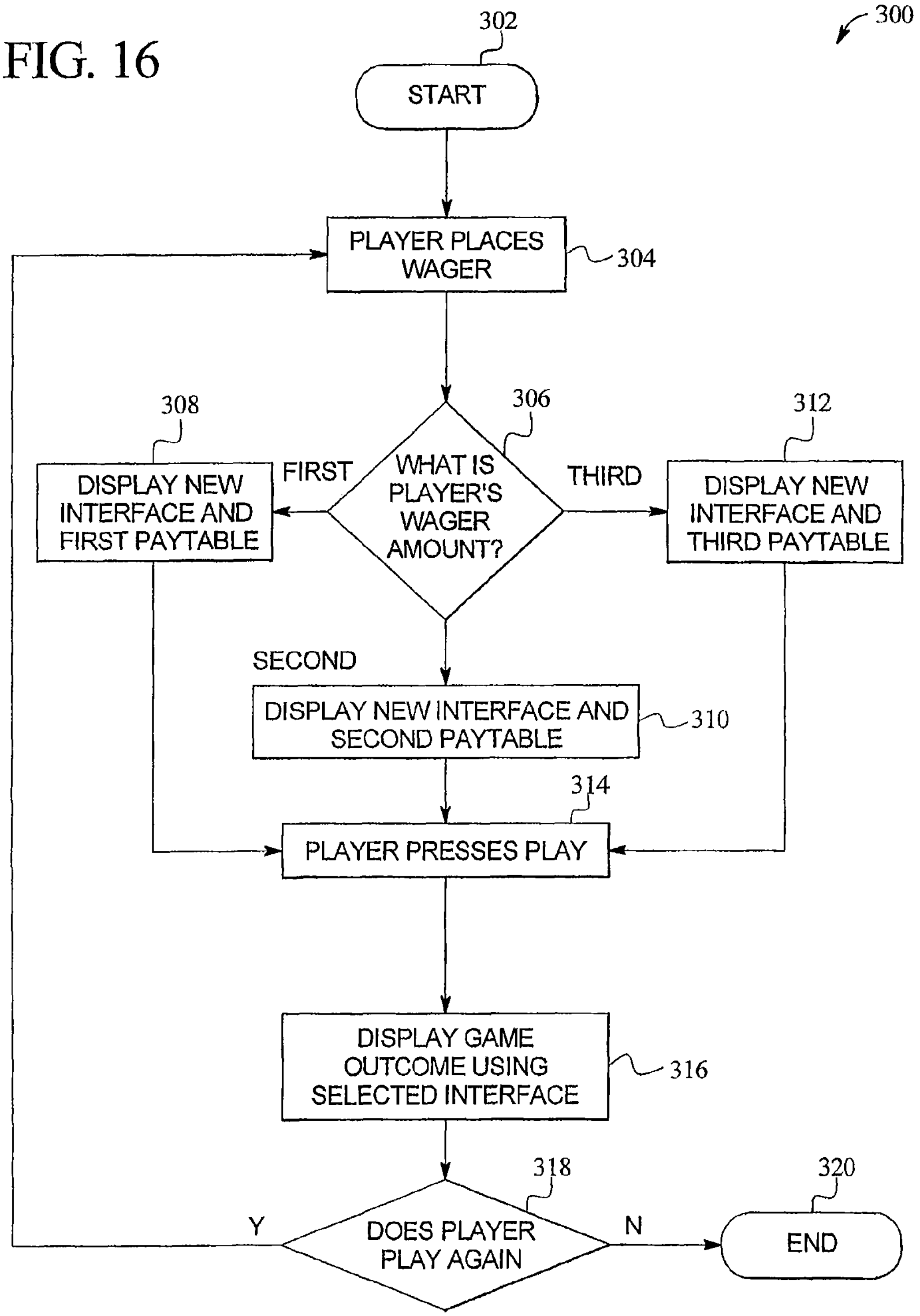
FIG. 16 is a schematic flow diagram illustrating one method of using the multiple display interfaces and paytables controlled by the player's wager amount.

FIG. 16 illustrates a method for playing a game employing changeable interfaces and/or paytables based on the player's wager. In method 300, the method is started as indicated by oval 302. The player then places an appropriate wager amount as indicated by block 304. If the player's wager amount is a first value, then a corresponding interface is displayed and the gaming device employs a first paytable as indicated by block 308. If the player's wager amount is a second value, then a different interface is displayed and the gaming device employs a second paytable as indicated by block 310. If the player's wager amount is a third value, then a different interface is displayed and the gaming device employs a third different paytable as indicated by block 312. Upon the play or spin input, indicated by block 314, a game outcome is generated based on the selected paytable and displayed as illustrated in block 316. Finally, if the player decides to play again as indicated by diamond 318, the play is looped back to block 304. If the player does not decide to play again, the method 300 ends as indicated by block 320.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device, for a single play of a game, to:

(a) display a plurality of reels associated with the single play of the game;

(b) display a plurality of different paylines associated with the reels;

(c) receive an input from a player of one of a plurality of different wager amounts for the single play of the game, the received wager amount corresponding to one of a plurality of different amounts wagered per payline for each of a designated number of the paylines for the single play of the game, the designated number including one, a plurality or all of the paylines;

(d) in response to the received input of one of the wager amounts from the player for the single play of the game, determine an interface from a plurality of different interfaces for the single play of the game, wherein:

(i) each different interface is associated with a different paytable, (ii) each of the different interfaces includes a plurality of different symbols which each have a function in the paytable associated with that interface, (iii) for each of the different interfaces, each one of a plurality of the symbols of said interface has an identical function to a corresponding one of a plurality of the symbols in another one of the interfaces, and (iv) each of the different paytables for the different interfaces includes a plurality of different winning combinations of the symbols of said interface and a plurality of different awards associated with said different winning combinations, said determination based, at least in part, on the amount wagered per payline for the designated number of the paylines for the single play of the game;

(e) display the determined interface for the single play of the game; and (f) provide an outcome for the single play of the game in association with the determined interface for the single play of the game, the outcome based on the paytable associated with the determined interface.

2. The gaming system of claim 1, wherein the plurality of different interfaces includes a first interface and a second different interface and the plurality of instructions, when executed by the at least one processor, cause the at least one processor to: (i) cause a display of the first interface when the received input corresponds to a first amount wagered per payline, and (ii) cause a display of the second interface when the received input corresponds to a second different amount wagered per payline.

3. The gaming system of claim 2, wherein the plurality of different paytables includes a first paytable and a second different paytable, and the plurality of instructions, when executed by the at least one processor, cause the at least one processor to: (i) provide the outcome based on the first paytable when the received input from the player corresponds to the first amount wagered per payline, and (ii) provide the outcome based on the second paytable when the received input from the player corresponds to the second different amount wagered per payline.

4. The gaming system of claim 1, wherein the plurality of different paytables includes a first paytable and a second different paytable, and the plurality of instructions, when executed by the at least one processor, cause the at least one processor to: (i) provide the outcome based on the first paytable when the received input from the player corresponds to a first amount wagered per payline, and (ii) provide the outcome based on the second paytable when the received input from the player corresponds to a second different amount wagered per payline.

5. The gaming system of claim 1, wherein a plurality of the interfaces includes a plurality of different characteristics, the plurality of different characteristics including at least one of: (i) an interface color, (ii) an interface design, (iii) a number of components, (iv) an ordering of the components, and (v) a proportion of the components.

6. The gaming system of claim 1, wherein for each of the different interfaces, each one of the symbols of said interface has the identical function to a corresponding one of the symbols in another one of the interfaces.

7. The gaming system of claim 1, wherein for each one of the paytables: (i) each one of the different winning combinations of said paytable is associated with a different one of the awards, and (ii) each one of the different winning combinations of said paytable is associated with an identical award as a corresponding one of the winning combinations in another one of the paytables.

8. A gaming system comprising;

at least one display device;

at least one input device;

at least one processor; and at least one memory device which stores:

(a) data corresponding to:

(i) a game including a plurality of reels and a plurality of different paylines associated with the reels, (ii) a first game display interface in association with a single play of the game, the first game display interface including a first set of different symbols displayable on the reels, (iii) a first paytable associated with the first game display interface, wherein the first paytable includes a first set of awards, (iv) a second game display interface in association with the single play of the game, the second game display interface including a second set of different symbols displayable on the reels, the second set of symbols being different from the first set of symbols, and (v) a second paytable associated with the second game display interface, wherein the second paytable includes a second set of awards which is different from the first set of awards; and (b) a plurality of instructions, which when executed by the at least one processor, cause the at least one processor to operate with the at least one display device and the at least one input device, for the single play of the game, to:

(i) receive one of a plurality of different inputs from a player for the single play of the game, the received input corresponding to a first wager amount for each of a quantity of the paylines or to a second, different wager amount for each of the quantity of the paylines for the single play of the game, said quantity being at least one, (ii) in response to the received input corresponding to the first wager amount for each of the quantity of the paylines, display the first game display interface associated with the first paytable to represent the single play of the game, wherein the first set of symbols are displayed on the reels for the single play of the game, and (iii) in response to the received input corresponding to the second, different wager amount for each of the quantity of the paylines, display the second game display interface associated with the second paytable to represent the single play of the game, wherein the second set of symbols are displayed on the reels for the single play of the game.

9. The gaming system of claim 8, wherein when executed by the at least one processor, the plurality of instructions cause the at least one processor to, in response to the received input corresponding to the first wager amount for each of the quantity of the paylines, display an outcome including a plurality of the first set of symbols for the play of the game in association with the first game display interface, wherein the displayed outcome is based on the first paytable.

10. The gaming system of claim 8, wherein when executed by the at least one processor, the plurality of instructions cause the at least one processor to, in response to the received input corresponding to the second wager amount for each of the quantity of the paylines, display an outcome including a plurality of the second set of symbols for the play of the game in association with the second game display interface, wherein the displayed outcome is based on the second paytable.

11. A method of operating a gaming system, said method comprising:

causing at least one processor, at least one display device and at least one input device, for a single play of a game, to:

(a) display a plurality of reels associated with the single play of the game, (b) display a plurality of different paylines associated with the reels, (c) receive an input from a player of one of a plurality of different wager amounts for the single play of the game, the received wager amount corresponding to one of a plurality of different amounts wagered per payline for each of a designated number of the paylines for the single play of the game, the designated number including one, a plurality or all of the paylines, (d) in response to the received input of one of the wager amounts from the player for the single play of the game, determine an interface from a plurality of different interfaces for the single play of the game, wherein:

(i) each different interface is associated with a different paytable, (ii) each of the different interfaces includes a plurality of different symbols which each have a function in the paytable associated with that interface, (iii) for each of the different interfaces, each one of a plurality of the symbols of said interface has an identical function to a corresponding one of a plurality of the symbols in another one of the interfaces, and (iv) each of the different paytables for the different interfaces includes a plurality of different winning combinations of the symbols of said interface and a plurality of different awards associated with said different winning combinations, said determination based, at least in part, on the amount wagered per payline for the designated number of the paylines for the single play of the game, and (e) display the determined interface for the single play of the game; and causing at least one processor and the at least one display device, for the single play of the game, to provide an outcome in association with the determined interface, the outcome based on the paytable associated with the determined interface.

12. The method of claim 11, wherein the plurality of different interfaces includes a first interface and a second different interface and which includes causing at least one processor and the at least one display device, for the single play of the game, to: (i) cause a display of the first interface when the received input corresponds to a first amount wagered per payline, and (ii) cause a display of the second interface when the received input corresponds to a second different amount wagered per payline.

13. The method of claim 11, wherein the plurality of different paytables includes a first paytable and a second different paytable, and which includes causing at least one processor and the at least one display device, for the single play of the game, to: (i) provide the outcome based on the first paytable when the received input from the player corresponds to the first amount wagered per payline, and (ii) provide the outcome based on the second paytable when the received input from the player corresponds to the second different amount wagered per payline.

14. The method of claim 11, wherein the plurality of different paytables includes a first paytable and a second different paytable, and which includes causing at least one processor and the at least one display device, for the single play of the game, to: (i) provide the outcome based on the first paytable when the received input from the player corresponds to a first amount wagered per payline, and (ii) provide the outcome based on the second paytable when the received input from the player corresponds to a second different amount wagered per payline.

15. The method of claim 11, wherein a plurality of the interfaces includes a plurality of different characteristics, the plurality of different characteristics including at least one of: (i) an interface color, (ii) an interface design, (iii) a number of components, (iv) an ordering of the components, and (v) a proportion of the components.

16. The method of claim 11, wherein for each of the different interfaces, each one of the symbols of said interface has the identical function to a corresponding one of the symbols in another one of the interfaces.

17. The method of claim 11, wherein for each one of the paytables: (i) each one of the different winning combinations of said paytable is associated with a different one of the awards, and (ii) each one of the different winning combinations of said paytable is associated with an identical award as a corresponding one of the winning combinations in another one of the paytables.

18. The method of claim 11, which is provided to the player through a data network.

19. The method of claim 18, wherein the data network is an Internet.

20. A method of operating a gaming system, said method comprising;

(a) accessing at least one memory device which stores data corresponding to:

(i) a game including a plurality of reels and a plurality of different paylines associated with the reels, (ii) a first game display interface in association with a single play of the game, the first game display interface including a first set of different symbols displayable on the reels, (iii) a first paytable associated with the first game display interface, wherein the first paytable includes a first set of awards, (iv) a second game display interface in association with the single play of the game, the second game display interface including a second set of different symbols displayable on the reels, the second set of symbols being different from the first set of symbols, and (v) a second paytable associated with the second game display interface, wherein the second paytable includes a second set of awards which is different from the first set of awards; and (b) causing at least one processor, at least one display device and at least one input device, for a single play of a game, to:

(i) receive one of a plurality of different inputs from a player for the single play of the game, the received input corresponding to a first wager amount for each of a quantity of the paylines or to a second, different wager amount for each of the quantity of the paylines for the single play of the game, said quantity being at least one, (ii) in response to the received input corresponding to the first wager amount for each of the quantity of the paylines, display the first game display interface associated with the first paytable to represent the single play of the game, wherein the first set of symbols are displayed on the reels for the single play of the game, and (iii) in response to the received input corresponding to the second, different wager amount for each of the quantity of the paylines, display the second game display interface associated with the second paytable to represent the single play of the game, wherein the second set of symbols are displayed on the reels for the single play of the game.

21. The method of claim 20, which includes causing the at least one processor, the at least one display device and the at least one input device to, in response to the received input corresponding to the first wager amount for each of the quantity of the paylines, display an outcome including a plurality of the first set of symbols for the single play of the game in association with the first game display interface, wherein the displayed outcome is based on the first paytable.

22. The method of claim 20, which includes causing the at least one processor, the at least one display device and the at least one input device to, in response to the received input corresponding to the second wager amount for each of the quantity of the paylines, display an outcome including a plurality of the second set of symbols for the single play of the game in association with the second game display interface, wherein the displayed outcome is based on the second paytable.

23. The method of claim 20, which is provided to the player through a data network.

24. The method of claim 23, wherein the data network is an internet.

* * * * *

UNITED STATES PATENT AND TRADEMARK OFFICE

CERTIFICATE OF CORRECTION

PATENT NO. : 8,221,218 B2
APPLICATION NO. : 12/713392
DATED : July 17, 2012
INVENTOR(S) : John G. Gilliland et al.

It is certified that error appears in the above-identified patent and that said Letters Patent is hereby corrected as shown below:

IN THE CLAIMS

Column 30, in Claim 9, Line 62, between “the” and “play” insert --single--.
Column 31, in Claim 10, Line 3, between “the” and “play” insert --single--.
Column 31, in Claim 11, Line 47, between “causing” and “at” insert --the--.
Column 31, in Claim 12, Line 54, between “causing” and “at” insert --the--.
Column 31, in Claim 13, Line 63, between “causing” and “at” insert --the--.
Column 32, in Claim 14, Line 6, between “causing” and “at” insert --the--.
Column 32, in Claim 19, Line 35, replace “Internet” with --internet--.
Column 32, in Claim 20, Lines 59 and 60, replace both instances of “a” with --the--.

Signed and Sealed this
First Day of January, 2013

David J. Kappos
*Director of the United States Patent and Trademark Office*